US012671557B2

(12) United States Patent (10) Patent No.: US 12,671,557 B2
Wang et al. (45) Date of Patent: Jun. 30, 2026

(54) TRIGGER STATE CONFIGURATION AND CSI REPORT TRIGGERING FOR DYNAMIC SPECTRUM SHARING (DSS) WITH CARRIER AGGREGATION (CA)

(71) Applicant: Telefonaktiebolaget LM Ericsson (publ), Stockholm (SE)

(72) Inventors: Wei Wang, Kanata (CA); Hong Ren, Kanata (CA)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 293 days.

(21) Appl. No.: 18/576,455

(22) PCT Filed: Jul. 8, 2021

(86) PCT No.: PCT/IB2021/056160
§ 371 (c)(1),
(2) Date: Jan. 4, 2024

(87) PCT Pub. No.: WO2023/281300
PCT Pub. Date: Jan. 12, 2023

(65) Prior Publication Data
US 2024/0313930 A1 Sep. 19, 2024

(51) Int. Cl.
*H04L 5/00* (2006.01)

(52) U.S. Cl.
CPC ............ *H04L 5/006* (2013.01); *H04L 5/0053* (2013.01)

(58) Field of Classification Search
CPC ..... H04L 5/006; H04L 5/0053; H04L 5/0048; H04L 5/0064
See application file for complete search history.

(56) References Cited

U.S. PATENT DOCUMENTS

| | | | | |
|---|---|---|---|---|
| 6,256,394 | B1 * | 7/2001 | Deville | H04R 27/00 |
| | | | | 381/56 |
| 2020/0358540 | A1 * | 11/2020 | Yokomakura | H04L 5/001 |
| 2021/0067304 | A1 | 3/2021 | Yokomakura et al. | |

OTHER PUBLICATIONS

International Search Report and Written Opinion dated Jun. 10, 2022 for International Application No. PCT/IB2021/056160 filed Jul. 8, 2021 consisting of 18-pages.
S.N.A. Esaadah; LTE-NR FDD Spectrum Sharing Enabler; Ericsson; Mar. 10, 2021; consisting of 84-pages.

(Continued)

*Primary Examiner* — Gbemileke J Onamuti
(74) *Attorney, Agent, or Firm* — Weisberg I.P. Law, P.A.

(57) ABSTRACT

Systems and methods are disclosed herein for effectively using channel resources, by a radio access node of Dynamic Spectrum Sharing (DSS) system with carrier aggregation, by adaptively selecting a set of trigger states based on sets of parameters. In one example, a method includes selecting trigger states from candidate trigger states, configuring the selected trigger states, and triggering Channel State Information (CSI) reports for the trigger states. In one example, the selected trigger states include trigger states that are less than or equal to a maximum number of trigger states supported by the wireless communication device. The candidate trigger states include trigger state 0 for a first CSI report for a mixed interference scenario, trigger state 1 for a second CSI report for a non-mixed interference scenario, and trigger state 2 for the first and the second CSI reports.

15 Claims, 12 Drawing Sheets

(56)     References Cited

OTHER PUBLICATIONS

3GPP TS 38.321 V16.0.0; 3rd Generation Partnership Project; Technical Specification Group Radio Access Network; NR; Medium Access Control (MAC) protocol specification (Release 16); Mar. 2020; consisting of 141-pages.
ETSI TS 138 331 V16.4.1; Technical Specification; 5G; NR; Radio Resource Control (RRC); Protocol specification (3GPP TS 38.331 version 16.4.1 Release 16); Apr. 2021; consisting of 932-pages.
3GPP TS 38.214 V16.5.0; 3rd Generation Partnership Project; Technical Specification Group Radio Access Network; NR; Physical layer procedures for data (Release 16); Mar. 2021; consisting of 171-pages.
3GPP TSG RAN WG1 Meeting #92 R1-1802740; Title: CSI framework simplification; Agenda Item: 7.1.2.2; Source: Ericsson; Document for: Discussion and Decision; Date and Location: Feb. 6-Mar. 2, 2018, Athens, Greece, consisting of 8-pages.
3GPP TSG RAN WG2 Meeting #101 R2-1803705 (Same as R1-1802076); Title: Overview of the CSI configuration framework; Agenda Item: 10.4.3.2; Source: Huawei, HiSilicon; Document for: Discussion and decision; Date and Location: Feb. 26-Mar. 2, 2018, Athens, Greece, consisting of 9-pages.

* cited by examiner

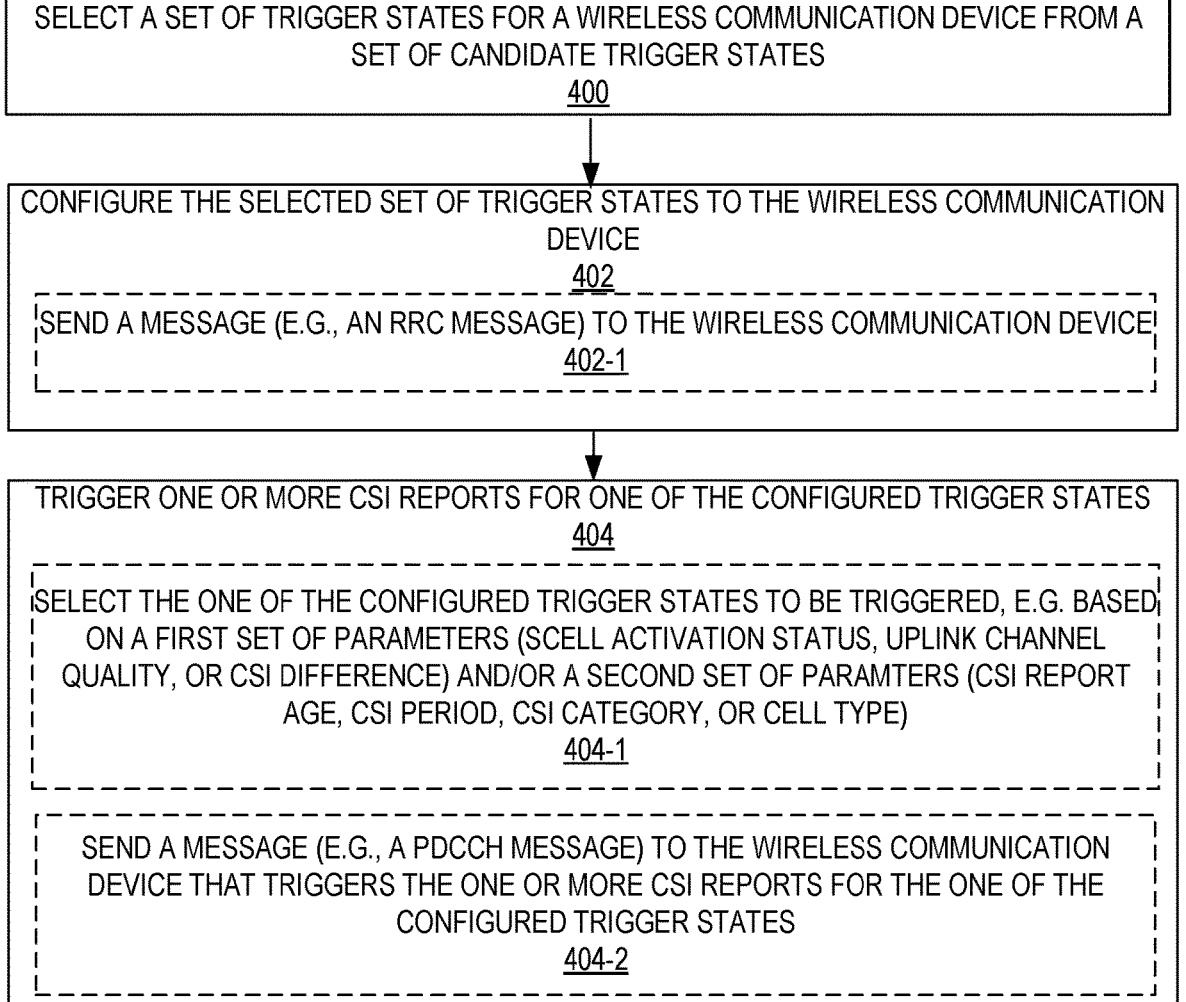

SELECT A SET OF TRIGGER STATES FOR A WIRELESS COMMUNICATION DEVICE FROM A
SET OF CANDIDATE TRIGGER STATES
400

CONFIGURE THE SELECTED SET OF TRIGGER STATES TO THE WIRELESS COMMUNICATION
DEVICE
402

SEND A MESSAGE (E.G., AN RRC MESSAGE) TO THE WIRELESS COMMUNICATION DEVICE
402-1

TRIGGER ONE OR MORE CSI REPORTS FOR ONE OF THE CONFIGURED TRIGGER STATES
404

SELECT THE ONE OF THE CONFIGURED TRIGGER STATES TO BE TRIGGERED, E.G. BASED
ON A FIRST SET OF PARAMETERS (SCELL ACTIVATION STATUS, UPLINK CHANNEL
QUALITY, OR CSI DIFFERENCE) AND/OR A SECOND SET OF PARAMTERS (CSI REPORT
AGE, CSI PERIOD, CSI CATEGORY, OR CELL TYPE)
404-1

SEND A MESSAGE (E.G., A PDCCH MESSAGE) TO THE WIRELESS COMMUNICATION
DEVICE THAT TRIGGERS THE ONE OR MORE CSI REPORTS FOR THE ONE OF THE
CONFIGURED TRIGGER STATES
404-2

*FIG. 4*

| CC COMBINATIONS: P (PRIMARY CELL), S1 (SECONDARY CELL 1), S2 (SECONDARY CELL 2) | CONFIGURED SET OF TRIGGER STATES (TS) | CANDIDATE SET OF TRIGGER STATES | | |
|---|---|---|---|---|
| | | TRIGGER STATE 0 (TS_0) (MIXED INTERFERENCE) | TRIGGER STATE 1 (TS_1) (PURE NR INTERFERENCE) | TRIGGER STATE 2 (TS_2) (MIXED INTERFERENCE + PURE NR INTERFERENCE) |
| P | $TS_p$ | $TS_{p,0}$ | $TS_{p,1}$ | $TS_{p,2}$ |
| S1 | $TS_{s1}$ | $TS_{s1,0}$ | $TS_{s1,1}$ | $TS_{s1,2}$ |
| S2 | $TS_{s2}$ | $TS_{s2,0}$ | $TS_{s2,1}$ | $TS_{s2,2}$ |
| P+S1 | $TS_{p+s1}$ | $TS_{p+s1,0}$ | $TS_{p+s1,1}$ | $TS_{p+s1,2}$ |
| P+S2 | $TS_{p+s2}$ | $TS_{p+s2,0}$ | $TS_{p+s2,1}$ | $TS_{p+s2,2}$ |
| S1+S2 | $TS_{s1+s2}$ | $TS_{s1+s2,0}$ | $TS_{s1+s2,1}$ | $TS_{s1+s2,2}$ |
| P+S1+S2 | $TS_{p+s1+s2}$ | $TS_{p+s1+s2,0}$ | $TS_{p+s1+s2,1}$ | $TS_{p+s1+s2,2}$ |

$TS_0$   NR+LTE $TS_1$   PURE NR $TS_2$   NR+LTE / PURE NR

*FIG. 5*

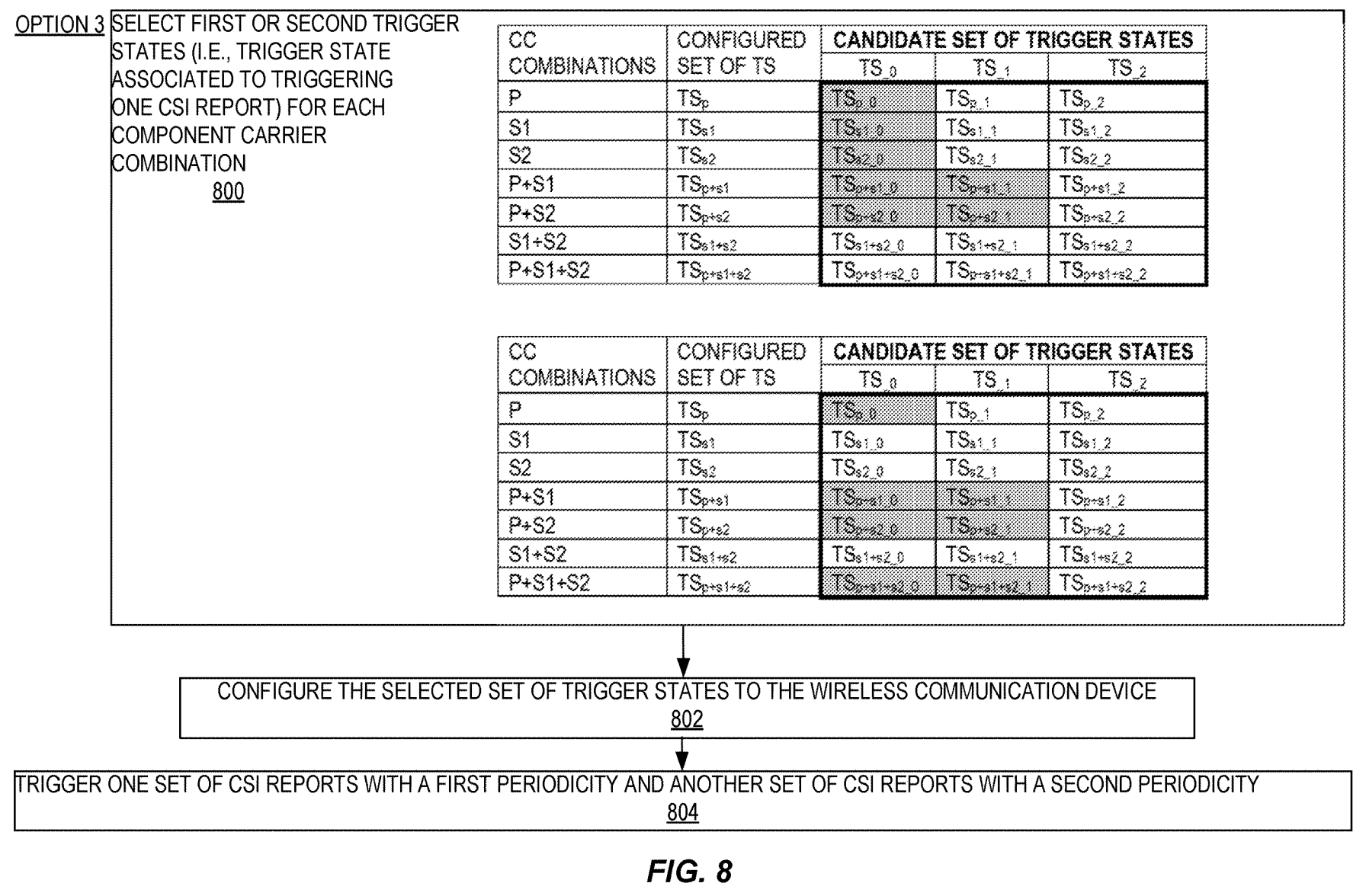

OPTION 3  SELECT FIRST OR SECOND TRIGGER STATES (I.E., TRIGGER STATE ASSOCIATED TO TRIGGERING ONE CSI REPORT) FOR EACH COMPONENT CARRIER COMBINATION
800

| CC COMBINATIONS | CONFIGURED SET OF TS | CANDIDATE SET OF TRIGGER STATES | | |
| --- | --- | --- | --- | --- |
| | | $TS_0$ | $TS_1$ | $TS_2$ |
| P | $TS_p$ | $TS_{p,0}$ | $TS_{p,1}$ | $TS_{p,2}$ |
| S1 | $TS_{s1}$ | $TS_{s1,0}$ | $TS_{s1,1}$ | $TS_{s1,2}$ |
| S2 | $TS_{s2}$ | $TS_{s2,0}$ | $TS_{s2,1}$ | $TS_{s2,2}$ |
| P+S1 | $TS_{p+s1}$ | $TS_{p+s1,0}$ | $TS_{p+s1,1}$ | $TS_{p+s1,2}$ |
| P+S2 | $TS_{p+s2}$ | $TS_{p+s2,0}$ | $TS_{p+s2,1}$ | $TS_{p+s2,2}$ |
| S1+S2 | $TS_{s1+s2}$ | $TS_{s1+s2,0}$ | $TS_{s1+s2,1}$ | $TS_{s1+s2,2}$ |
| P+S1+S2 | $TS_{p+s1+s2}$ | $TS_{p+s1+s2,0}$ | $TS_{p+s1+s2,1}$ | $TS_{p+s1+s2,2}$ |

| CC COMBINATIONS | CONFIGURED SET OF TS | CANDIDATE SET OF TRIGGER STATES | | |
| --- | --- | --- | --- | --- |
| | | $TS_0$ | $TS_1$ | $TS_2$ |
| P | $TS_p$ | $TS_{p,0}$ | $TS_{p,1}$ | $TS_{p,2}$ |
| S1 | $TS_{s1}$ | $TS_{s1,0}$ | $TS_{s1,1}$ | $TS_{s1,2}$ |
| S2 | $TS_{s2}$ | $TS_{s2,0}$ | $TS_{s2,1}$ | $TS_{s2,2}$ |
| P+S1 | $TS_{p+s1}$ | $TS_{p+s1,0}$ | $TS_{p+s1,1}$ | $TS_{p+s1,2}$ |
| P+S2 | $TS_{p+s2}$ | $TS_{p+s2,0}$ | $TS_{p+s2,1}$ | $TS_{p+s2,2}$ |
| S1+S2 | $TS_{s1+s2}$ | $TS_{s1+s2,0}$ | $TS_{s1+s2,1}$ | $TS_{s1+s2,2}$ |
| P+S1+S2 | $TS_{p+s1+s2}$ | $TS_{p+s1+s2,0}$ | $TS_{p+s1+s2,1}$ | $TS_{p+s1+s2,2}$ |

CONFIGURE THE SELECTED SET OF TRIGGER STATES TO THE WIRELESS COMMUNICATION DEVICE
802

TRIGGER ONE SET OF CSI REPORTS WITH A FIRST PERIODICITY AND ANOTHER SET OF CSI REPORTS WITH A SECOND PERIODICITY
804

FIG. 8

IF WIRELESS COMMUNICATION DEVICE SUPPORTS 15 OR MORE TRIGGER STATES

| CC COMBINATIONS | CONFIGURED SET OF TS | CANDIDATE SET OF TRIGGER STATES | | |
|---|---|---|---|---|
| | | $TS_1$ | $TS_2$ | $TS_2$ |
| P | $TS_p$ | $TS_{p,0}$ | $TS_{p,1}$ | $TS_{p,2}$ |
| S1 | $TS_{s1}$ | $TS_{s1,0}$ | $TS_{s1,1}$ | $TS_{s1,2}$ |
| S2 | $TS_{s2}$ | $TS_{s2,0}$ | $TS_{s2,1}$ | $TS_{s2,2}$ |
| P+S1 | $TS_{p+s1}$ | $TS_{p+s1,0}$ | $TS_{p+s1,1}$ | $TS_{p+s1,2}$ |
| P+S2 | $TS_{p+s2}$ | $TS_{p+s2,0}$ | $TS_{p+s2,1}$ | $TS_{p+s2,2}$ |
| S1+S2 | $TS_{s1+s2}$ | $TS_{s1+s2,0}$ | $TS_{s1+s2,1}$ | $TS_{s1+s2,2}$ |
| P+S1+S2 | $TS_{p+s1+s2}$ | $TS_{p+s1+s2,0}$ | $TS_{p+s1+s2,1}$ | $TS_{p+s1+s2,2}$ |

IF DIFFERENT REPORTING PERIODS ARE PREFERRED,

| CC COMBINATIONS | CONFIGURED SET OF TS | CANDIDATE SET OF TRIGGER STATES | | |
|---|---|---|---|---|
| | | $TS_0$ | $TS_1$ | $TS_2$ |
| P | $TS_p$ | $TS_{p,0}$ | $TS_{p,1}$ | $TS_{p,2}$ |
| S1 | $TS_{s1}$ | $TS_{s1,0}$ | $TS_{s1,1}$ | $TS_{s1,2}$ |
| S2 | $TS_{s2}$ | $TS_{s2,0}$ | $TS_{s2,1}$ | $TS_{s2,2}$ |
| P+S1 | $TS_{p+s1}$ | $TS_{p+s1,0}$ | $TS_{p+s1,1}$ | $TS_{p+s1,2}$ |
| P+S2 | $TS_{p+s2}$ | $TS_{p+s2,0}$ | $TS_{p+s2,1}$ | $TS_{p+s2,2}$ |
| S1+S2 | $TS_{s1+s2}$ | $TS_{s1+s2,0}$ | $TS_{s1+s2,1}$ | $TS_{s1+s2,2}$ |
| P+S1+S2 | $TS_{p+s1+s2}$ | $TS_{p+s1+s2,0}$ | $TS_{p+s1+s2,1}$ | $TS_{p+s1+s2,2}$ |

TRIGGER STATE CONFIGURATION AND CSI REPORT TRIGGERING FOR DYNAMIC SPECTRUM SHARING (DSS) WITH CARRIER AGGREGATION (CA)

CROSS-REFERENCE TO RELATED APPLICATION

This application is a Submission Under 35 U.S.C. § 371 for U.S. National Stage Patent Application of International Application Number: PCT/IB2021/056160, filed Jul. 8, 2021 entitled "TRIGGER STATE CONFIGURATION AND CSI REPORT TRIGGERING FOR DYNAMIC SPECTRUM SHARING (DSS) WITH CARRIER AGGREGATION (CA)," the entirety of which is incorporated herein by reference.

TECHNICAL FIELD

The present disclosure relates to trigger state configuration and Channel State Information (CSI) report triggering for a Dynamic Spectrum Sharing (DSS) system with Carrier Aggregation (CA)

BACKGROUND

Along with the evolution of New Radio (NR) technology, a Dynamic Spectrum Sharing (DSS) system between Fourth Generation (4G) Long-Term Evolution (LTE) and Fifth Generation (5G) NR was introduced, e.g. in lower frequency bands. The DSS system may be used by existing LTE User Equipments (UEs) and also fulfill the need of operating NR. In the DSS system, there are several different ways that the spectrum can be shared between 4G LTE and 5G NR. For example, in the Ericsson Spectrum Sharing (ESS) system, which is an example of the DSS system, instant spectrum sharing was proposed. That is, the spectrum allocated to each Radio Access Technology (RAT) may change in every subframe based on traffic demands of each RAT. As illustrated in FIG. 1, the spectrum of the ESS system is shared between LTE and NR in both frequency and time domains.

NR Channel State Information Reference Signal (CSI-RS)/Channel State information Interference Measurement (CSI-IM)

In NR, CSI-RS is the reference signal typically used by a UE to acquire a CSI. CSI-RS is a set of resources configured to the UE for the purpose of CSI measurement. For different numbers of antenna ports, the resources reserved for CSI-RS are different and configurable by Radio Resource Control (RRC). CSI-IM is a set of specific resources introduced for interference measurement. The CSI-IM resource is configurable by an RRC.

All the reference signals designed specifically for NR UEs are not backward compatible with LTE UEs, but the reference signals for NR UEs normally span through the whole frequency spectrum with a few Resource Elements (REs) in each Resource Block (RB). Thus, Multimedia Broadcast Multicast Service Single Frequency Network (MBSFN) was introduced as a part of the ESS system. Originally, MBSFN is a special subframe configured and used for Multimedia Broadcast Multicast Services (MBMS) transmission. In the ESS system, however, MBSFN was proposed to be used for the DSS system if the MBSFN is not used for MBMS traffic. MBSFN subframes include NR reference signals, such as Tracking Reference Signal (TRS), CSI-RS, and CSI-IM. Physical Downlink Shared Channel (PDSCH) in LTE is not scheduled in MBSFN subframes. Since LTE UEs are not scheduled in MBSFN subframes, the NR reference signals do not impact PDSCH decoding in LTE. As a result, inter-cell interference generated during MBSFN subframes is measured only for NR. Throughout the present application, the inter-cell interference generating during MBSFN subframes is referred to as "pure NR" interference.

In contrast, in non-MBSFN subframes, inter-cell interference generated during those non-MBSFN subframes could be NR and/or LTE depending on the DSS schemes between LTE and NR. For four transmitters (4Tx) deployment, the first two symbols of a slot or subframe are reserved for LTE UE for the transmission of LTE Cell-specific Reference Signals (CRS) and control channels. For the other 12 symbols of the slot or subframe, the spectrum is shared dynamically between LTE and NR UEs based on traffic demands. For 2Tx deployment, the first symbol of a slot or subframe is reserved for LTE UE for the transmission of LTE CRS and control channels. For the other 13 symbols of the slot or subframe, the spectrum is shared dynamically between LTE and NR UEs based on traffic demands. There are no other NR reference signals transmitted in non-MBSFN subframes.

In the DSS system, two CSI-IM resources may be configured for the measurement of all the possible inter-cell interference. In particular:

CSI-IM resource 1 is configured in MBSFN subframes for the serving cell, for example, every 20 milliseconds (ms), which are overlapped with non-MBSFN subframes in neighboring cells. Another way is to configure CSI-IM resource 2 in non-MBSFN subframes, i.e., regular slot, where CSI-IM resource 2 is configured in different slots among neighboring cells. In this way, both NR and LTE interference may be measured since both NR and LTE signals could be transmitted in non-MBSFN subframes.

CSI-IM resource 2 is configured in MBSFN subframes, for example, every 20 ms, which are overlapped with MBSFN subframes in neighboring cells. However, assuming that a time-synchronized network is used, MBSFN subframes are always allocated in fixed subframes aligned among all the cells, so only NR interference may be measured ("pure NR" interference) as only NR may be transmitted in MBSFN subframes.

NR Aperiodic CSI Report and Link Adaptation

In NR, an aperiodic CSI report is commonly used to derive downlink channel quality for link adaptation. As there are two CSI-IM resources (CSI-IM resource 1 and CSI-IM resource 2), which may be used to measure different inter-cell interference, a CSI report corresponding to each CSI-IM resource may be triggered to get CSI for different subframes, i.e., MBSFNs subframes (subframes with pure NR interference) and non-MBSFNs subframes (subframes with both NR and LTE interference).

Aperiodic CSI report in NR is triggered by a CSI request field in uplink grant, which is a Downlink Control Information (DCI) format 0 of Physical Downlink Control Channel (PDCCH). For example, Third Generation Partnership Project (3GPP) Technical Specification (TS) 38.214 V16.5.0, release 16, clause 5.4 states, "the CSI request field on a DCI triggers a CSI report(s) on PUSCH[.]" (emphasis in original). For each DCI, one of CSI aperiodic trigger states configured in an information element (IE) of an RRC message, CSI-AperiodicTriggerStateList, is triggered. A single CSI report can be triggered at one time if we configure one CSI-AssociatedReportConfigInfo under a CSI-AperiodicTriggerState. Multiple CSI reports can be triggered at one time if we configure more than one CSI-AssociatedReportConfigInfo under each CSI-Aperiodic-TriggerState. For example, 3GPP TS 38.331 V16.4.1, release 16, clause 6.3.2 states as follow:

---

- CSI-AperiodicTriggerStateList
The CSI-AperiodicTriggerStateList IE is used to configure the UE with a list of aperiodic
trigger states. Each codepoint of the DCI field "CSI request" is associated with one trigger
state (see TS 38.321 [3]. clause 6.1.3.13). Upon reception of the value associated with a trigger
state, the UE will perform measurement of CSI-RS, CSI-IM and/or SSB (reference signals)
and aperiodic reporting on L1 according to all entries in the associatedReportConfigInfoList
for that trigger state.

---

CSI-AperiodicTriggerStateList information element

---

```
-- ASN1START
-- TAG-CSI-APERIODICTRIGGERSTATELIST-START
CSI-AperiodicTriggerStateList ::=          SEQUENCE (SIZE (1..maxNrofCSI-AperiodicTriggers)) OF CSI-
AperiodicTriggerState
CSI-AperiodicTriggerState ::=              SEQUENCE {
    associatedReportConfigInfoList             SEQUENCE
(SIZE(1..maxNrofReportConfigPerAperiodicTrigger)) OF CSI-AssociatedReportConfigInfo,
    ...
}
CSI-AssociatedReportConfigInfo ::=         SEQUENCE {
    reportConfigId                             CSI-ReportConfigId,
    resourcesForChannel                        CHOICE {
        nzp-CSI-RS                                 SEQUENCE {
            resourceSet                                INTEGER (1..maxNrofNZP-CSI-RS-
ResourceSetsPerConfig),
            qcl-info                                   SEQUENCE (SIZE(1..maxNrofAP-CSI-RS-
ResourcesPerSet)) OF TCI-StateId
OPTIONAL -- Cond Aperiodic
        },
        csi-SSB-ResourceSet                        INTEGER (1..maxNrofCSI-SSB-ResourceSetsPerConfig)
    },
    csi-IM-ResourcesForInterference            INTEGER (1..maxNrofCSI-IM-ResourceSetsPerConfig)
OPTIONAL, -- Cond CSI-IM-ForInterference
    nzp-CSI-RS-ResourcesForInterference        INTEGER (1..maxNrofNZP-CSI-RS-ResourceSetsPerConfig)
OPTIONAL, -- Cond NZP-CSI-RS-ForInterference
    ...
}
-- TAG-CSI-APERIODICTRIGGERSTATELIST-STOP
-- ASN1STOP
```

---

When two CSI-AssociatedReportConfigInfo IEs are configured in an RRC message, each of the CSI-AssociatedReportConfigInfo IEs corresponds to one of the CSI-IM resources (CSI-IM resource 1 and CSI-IM resource 2). Then, three different trigger states may be configured under CSI-AperiodicTriggerStateList.

CSI-AperiodicTriggerState #0
   CSI-AssociatedReportConfigInfo #0
      CSI-ReportConfigId #0
   CSI-AperiodicTriggerState #1
      CSI-AssociatedReportConfigInfo #1
         CSI-ReportConfigId #1
   CSI-AperiodicTriggerState #2
      CSI-AssociatedReportConfigInfo #0
         CSI-ReportConfigId #0
      CSI-AssociatedReportConfigInfo #1
         CSI-ReportConfigId #1

In this way, different aperiodic CSI ("A-CSI") reports may be triggered by indicating the trigger state in DCI (i.e., DCI format 0, which is an "uplink grant") of PDCCH. When trigger state 0 ("CSI-AperiodicTriggerState #0") is configured, the first report configuration information ("CSI-AssociatedReportConfigInfo #0") is associated to trigger state 0, and thus A-CSI report 0 ("CSI-ReportConfigId #0") is triggered. When trigger state 1 ("CSI-AperiodicTriggerState #1") is configured, the second report configuration information ("CSI-AssociatedReportConfigInfo #1") is associated to trigger state 1, and thus A-CSI report 1 ("CSI-Report-ConfigId #1") is triggered. When trigger state 2 ("CSI-AperiodicTriggerState #2") is configured, both of the first report configuration information ("CSI-AssociatedReport-ConfigInfo #0") and the second report configuration information ("CSI-AssociatedReportConfigInfo #1") are associated to trigger state 2 and thus both of A-CSI report 0 ("CSI-ReportConfigId #0") and A-CSI report 1 ("CSI-ReportConfigId #1") are triggered. The mapping between the trigger states and A-CSI reports is summarized in Table 1:

TABLE 1

| Trigger State | A-CSI Report Configuration | CSI-IM Resources |
|---|---|---|
| 0 | 0 | CSI-IM 1 (Mixed interference) |
| 1 | 1 | CSI-IM 2 (Pure NR interference) |
| 2 | 0 and 1 | CSI-IM 1 and CSI-IM 2 |

Once an A-CSI report is received by a radio access node (for example, a base station (gNB) of NR), in link adaptation, A-CSI report 0 corresponding to CSI-IM resource 1 will be applied to the subframes having the mixed interference. A-CSI report 1 corresponding to CSI-IM resource 2 will be applied to the subframes having pure NR interference.

SUMMARY

Systems and methods for trigger state configuration and Channel State Information (CSI) report triggering for a Dynamic Spectrum Sharing (DSS) system with Carrier Aggregation (CA) are disclosed. In one embodiment, a method performed by a radio access node for a DSS comprises selecting a set of trigger states for a wireless communication device from a set of candidate trigger states. The selected set of trigger states comprises a number of trigger states that is less than or equal to a maximum number of trigger states supported by the wireless communication device. The set of candidate trigger states comprises, for each component carrier combination comprising one or more component carriers configured for the wireless communication device (a) trigger state 0 for triggering a first CSI report for a mixed interference scenario for the DSS system for each component carrier in the component carrier combination, (b) trigger state 1 for triggering a second CSI report for a non-mixed interference scenario for the DSS system for each component carrier in the component carrier combination, and (c) trigger state 2 for triggering both the first CSI report for the mixed interference scenario for the DSS system and the second CSI report for the non-mixed interference scenario for the DSS system for each component carrier in the component carrier combination. The method further comprises configuring the selected set of trigger states to the wireless communication device and triggering one or more CSI reports for one of the configured trigger states. By adaptively selecting the set of trigger states and triggering CSI reports for the selected set of trigger states, the method enables the radio access node to use channel resources effectively.

In one embodiment, configuring the selected set of trigger states to the wireless communication device comprises sending a first message to the wireless communication device that configures the wireless communication device with the selected set of trigger states. In one embodiment, the first message comprises a Radio Resource Control (RRC) message.

In one embodiment, triggering the one or more CSI reports for one of the configured trigger states comprises selecting the one of the configured trigger states to be triggered and sending a message, to the wireless communication device, that triggers the one or more CSI reports for the one of the configured trigger states. In one embodiment, selecting the one of the configured trigger states to be triggered comprises selecting the one of the configured trigger states to be triggered based on a first set of parameters. In one embodiment, the first set of parameters comprises: (a) activation status of one or more secondary cells, (b) uplink channel quality, (c) a difference between a first CSI measurement for subframes experiencing the mixed interference and a second CSI measurement for subframes experiencing the non-mixed interference in the DSS system, (d) a CSI report age representing a time interval since a last CSI report for the one of the configured trigger states is received, or (e) any combination of two or more of (a)-(d). In one embodiment, selecting the one of the configured trigger states to be triggered further comprises selecting the one of the configured trigger states to be triggered based on a second set of parameters, which comprises (f) a CSI report period, (g) a CSI category, (h) a cell type, (i) any combination of two or more of (f)-(i), or (j) any combination of any of (f)-(i) with any of (a)-(d) in the first set.

In one embodiment, the configured trigger states to be triggered comprise, for each component carrier combination, the trigger state 2 for the component carrier combination.

In one embodiment, the configured trigger states to be triggered comprise, for at least one first component carrier combination, either the trigger state 0 or the trigger state 1 for the at least one first component carrier combination; and for at least one second component carrier combination, the trigger state 2 for the at least one second component carrier combination. In one embodiment, the at least one first component carrier combination comprises component carrier combinations having a single component carrier, and the at least one second component carrier combination comprises component carrier combinations having at least two component carriers.

In one embodiment, the configured trigger states to be triggered comprise, for each component carrier combination, either the trigger state 0 or the trigger state 1 for the component carrier combination. In one embodiment, the configured trigger states to be triggered comprise either the first set of trigger states with a first periodicity or the second set of trigger states with a second periodicity.

In one embodiment, triggering the one or more CSI reports for the one of the configured trigger states comprises sending, to the wireless communication device, a second message that triggers the one or more CSI reports for the one of the configured trigger states. In one embodiment, the second message comprises a Physical Download Control Channel (PDCCH) message.

Corresponding embodiments of a radio access node for a DSS system are also disclosed. In one embodiment, a radio access node for a DSS system is adapted to select a set of trigger states for a wireless communication device from a set of candidate trigger states, configure the selected set of trigger states to the wireless communication device, and trigger one or more CSI reports for one of the configured trigger states. The selected set of trigger states consists of a number of trigger states that is less than or equal to a maximum number of trigger states supported by the wireless communication device. The set of candidate trigger states comprises, for each component carrier combination comprising one or more component carriers configured for the wireless communication device (a) trigger state 0 for triggering a first CSI report for a mixed interference scenario for the DSS system for each component carrier in the component carrier combination, (b) trigger state 1 for triggering a second CSI report for a non-mixed interference scenario for the DSS system for each component carrier in the component carrier combination, and (c) trigger state 2 for triggering both the first CSI report for the mixed interference scenario for the DSS system and the second CSI report for the non-mixed interference scenario for the DSS system for each component carrier in the component carrier combination.

In one embodiment, a radio access node for a DSS system comprises processing circuitry configured to cause the radio access node to select a set of trigger states for a wireless communication device from a set of candidate trigger states, configure the selected set of trigger states to the wireless communication device, and trigger one or more CSI reports for one of the configured trigger states. The selected set of trigger states consists of a number of trigger states that is less than or equal to a maximum number of trigger states supported by the wireless communication device. The set of candidate trigger states comprises, for each component carrier combination comprising one or more component carriers configured for the wireless communication device (a) trigger state 0 for triggering a first CSI report for a mixed interference scenario for the DSS system for each component carrier in the component carrier combination, (b) trigger state 1 for triggering a second CSI report for a non-mixed interference scenario for the DSS system for each component carrier in the component carrier combination, and (c) trigger state 2 for triggering both the first CSI report for the mixed interference scenario for the DSS system and the second CSI report for the non-mixed interference scenario for the DSS system for each component carrier in the component carrier combination.

In one embodiment, a method performed by a radio access node for a DSS system comprises obtaining an uplink Signal-to-Interference-plus-Noise-Ratio (SINR) and determining whether the uplink SINR is equal to or greater than an SINR threshold. The method further comprises, if the uplink SINR is not equal to or greater than the SINR threshold, selecting trigger state 0 for triggering a first CSI report for a mixed interference scenario for the DSS system, triggering a CSI report for the trigger state 0, selecting trigger state 1 for triggering a second CSI report for a non-mixed interference scenario for the DSS system, and triggering the CSI report for the trigger state 1. The method further comprises, if the uplink SINR is equal to or greater than the SINR threshold, the selecting trigger state 2 for triggering both the first CSI report for the mixed interference scenario for the DSS system and the second CSI report for the non-mixed interference scenario for the DSS system and triggering CSI reports for the trigger state 2.

In one embodiment, the method further comprises obtaining a difference between a first CSI measurement for subframes experiencing the mixed interference and a second CSI measurement for subframes experiencing the non-mixed interference in the DSS system, selecting one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system, and triggering one or more CSI reports for the one or more selected trigger states.

In one embodiment, selecting the one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system comprises determining that the difference is equal to or larger than a CSI threshold, and responsive to determining that the difference is equal to or larger than the CSI threshold, selecting the trigger state 0 and the trigger state 1 alternatively if the uplink SINR is lower than the SINR threshold, and selecting the trigger state 2 if the uplink SINR is equal to or greater than the SINR threshold.

In one embodiment, selecting the one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system comprises determining that the difference is not equal to or larger than a CSI threshold, responsive to determining that the difference is not equal to or larger than the CSI threshold, selecting the trigger state 0.

In one embodiment, selecting the one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system comprises determining that the difference is not equal to or larger than a CSI threshold, and responsive to determining that the difference is not equal to or larger than the threshold, determining that either (a) the number of consecutive selections of the trigger state 0 is equal to or greater than a selection threshold or (b) time since a first triggering of the trigger state 0 is equal to or greater than a counting threshold, determining that (c) the uplink SINR is not equal to or greater than the SINR threshold, and responsive to determining that either (a) the number of consecutive selections of the trigger state 0 is equal to or greater than the selection threshold or (b) the time since the first triggering of the trigger state 0 is equal to or greater than the counting threshold and determining that (c) the uplink SINR is not equal to or greater than the SINR threshold, selecting the trigger state 1.

In one embodiment, selecting the one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system comprises determining that the difference is not equal to or larger than a CSI threshold, and responsive to determining that the difference is not equal to or larger than the threshold, determining that either (a) the number of consecutive selections of the trigger state 0 is equal to or greater than a selection threshold or (b) time since a first triggering of the trigger state 0 is equal to or greater than a counting threshold, determining that (c) the uplink SINR is equal to or greater than the SINR threshold, and responsive to determining that either (a) the number of consecutive selections of the trigger state 0 is equal to or greater than the selection threshold or (b) the time since the first triggering of the trigger state 0 is equal to or greater than the counting threshold and determining that (c) the uplink SINR is equal to or greater than the SINR threshold, selecting the trigger state 2.

In one embodiment, selecting the one or more trigger states from among the trigger state 0, the trigger state 1, and the trigger state 2, based on the difference between the first CSI measurement for the subframes experiencing the mixed interference and the second CSI measurement for the subframes experiencing the non-mixed interference in the DSS system comprises determining that the difference is not equal to or larger than a CSI threshold, and responsive to determining that the difference is not equal to or larger than the CSI threshold, determining that (a) the number of consecutive selections of the trigger state 0 is not equal to or greater than a selection threshold and (b) time since a first triggering of the trigger state 0 is not equal to or greater than a counting threshold, and responsive to determining that (a) the number of consecutive selections of the trigger state 0 is not equal to or greater than the selection threshold and (b) the time since the first triggering of the trigger state 0 is not equal to or greater than the counting threshold, selecting the trigger state 0.

Corresponding embodiments of a radio access node for a DSS system are also disclosed. In one embodiment, a radio access node for a DSS system is adapted to obtain an uplink SINR and determine whether the uplink SINR is equal to or greater than the SINR threshold. The radio access node is further adapted to, if the uplink SINR is not equal to or greater than the SINR threshold, select trigger state 0 for triggering a first CSI report for a mixed interference scenario for the DSS system, trigger a CSI report for the trigger state 0, select trigger state 1 for triggering a second CSI report for a non-mixed interference scenario for the DSS system, and trigger a CSI report for the trigger state 1. The radio access node is further adapted to, if the uplink SINR is equal to or greater than the SINR threshold, select trigger state 2 for triggering both the first CSI report for the mixed interference scenario for the DSS system and the second CSI report for the non-mixed interference scenario for the DSS system and trigger CSI reports for the trigger state 2.

In one embodiment, a radio access node for a DSS system comprises processing circuitry configured to cause the radio access node to obtain an uplink SINR and determine whether the uplink SINR is equal to or greater than the SINR threshold. The processing circuitry is further configured to cause the radio access node to, if the uplink SINR is not equal to or greater than the SINR threshold, select trigger state 0 for triggering a first CSI report for a mixed interference scenario for the DSS system, trigger a CSI report for the trigger state 0, select trigger state 1 for triggering a second CSI report for a non-mixed interference scenario for the DSS system, and trigger a CSI report for the trigger state 1. The processing circuitry is further configured to cause the radio access node to, if the uplink SINR is equal to or greater than the SINR threshold, select trigger state 2 for triggering both the first CSI report for the mixed interference scenario for the DSS system and the second CSI report for the non-mixed interference scenario for the DSS system and trigger CSI reports for the trigger state 2.

BRIEF DESCRIPTION OF THE DRAWINGS

The accompanying drawing figures incorporated in and forming a part of this specification illustrate several aspects of the disclosure, and together with the description serve to explain the principles of the disclosure. Optional features are represented by dashed boxes.

FIG. 4 illustrates one example of a method of selecting, configuring, and triggering trigger states according to some embodiments of the present disclosure.

FIG. 5 illustrates one example of candidate set of trigger states when the DSS system has seven possible combinations of the three component carriers (P, S1, S2) and each combination has three trigger states according to some embodiments of the present disclosure.

FIG. 8 illustrates one example of Option 3 according to some embodiments of the present disclosure.

FIG. 9 illustrates examples of selected set of trigger states according to some embodiments of the present disclosure.

DETAILED DESCRIPTION

Figure 1:
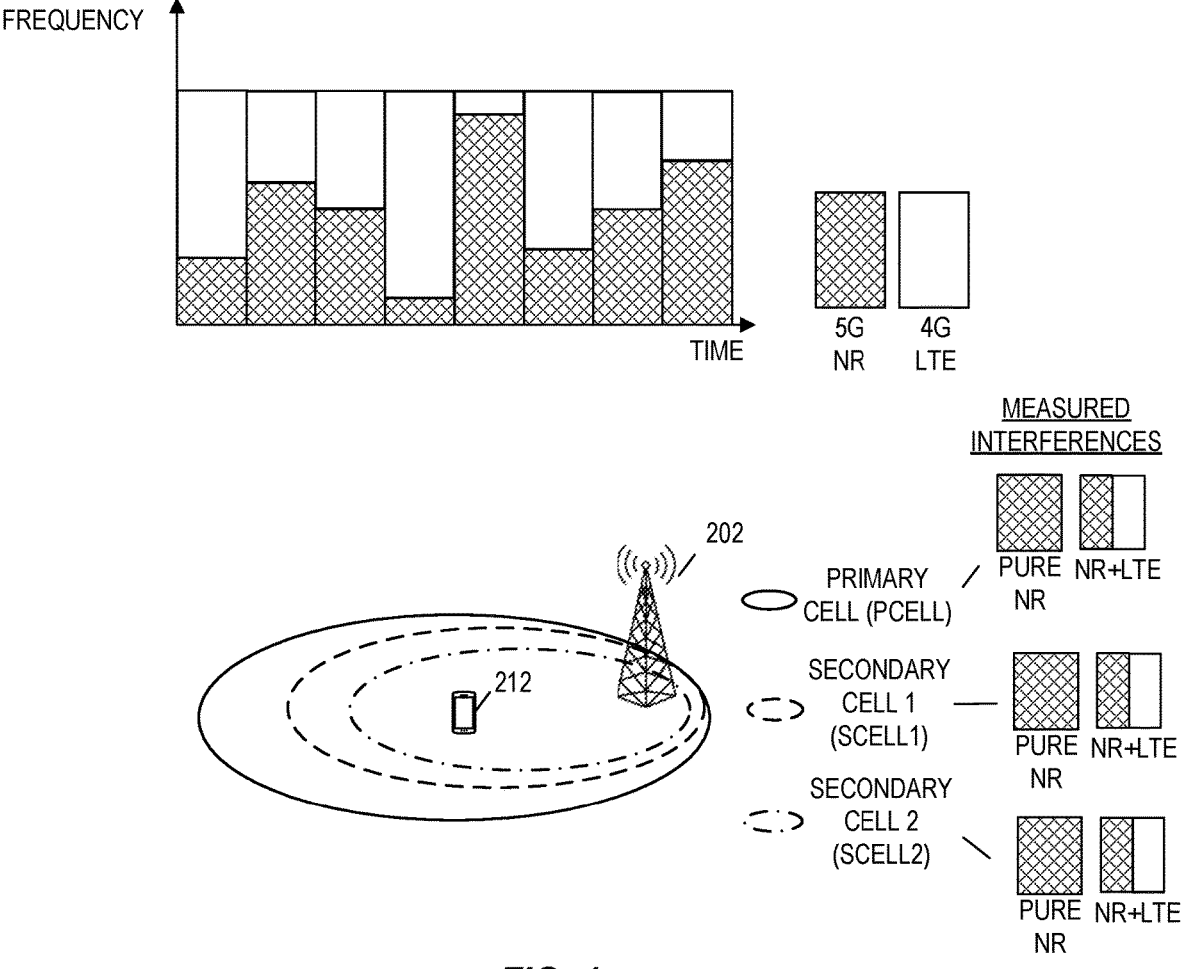
FIG. 1 illustrates one example of DSS system that implements spectrum sharing between Fourth Generation (4G) Long Term Evolution (LTE) and Fifth Generation (5G) New Radio (NR).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network and/or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station or a network node that implements a gNB Distributed Unit (gNB-DU)) or a network node that implements part of the functionality of some other type of radio access node.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Embodiments of methods performed by a radio access node for a Dynamic Spectrum Sharing (DSS) system are disclosed herein. In particular, the present disclosure is directed to methods and systems to determine a minimal number of trigger states based on the following criteria: User Equipment (UE) capability in terms of a maximum number of trigger states that can be configured, Physical Uplink Shared Channel (PUSCH) payload limitation due to poor uplink quality, Physical Downlink Control Channel (PDCCH) usage for triggering Channel Status Information (CSI) reports, Carrier Aggregation (CA) deployment, CSI reporting periods, and a CSI difference among subframes. The present disclosure is also directed to a method about how to switch between different trigger states (e.g., trigger state 0, trigger state 1, and trigger state 2) based on measurements of multiple parameters.

FIG. 1 illustrates one example embodiment in which DSS is used to dynamically share the frequency spectrum used by the base station 202 between 4G LTE traffic transmissions and 5G NR traffic transmissions in the time and the frequency domains. Also, FIG. 1 illustrates that the base station 202 may be working with, for example, three component carriers (CCs): a Primary Component Carrier (PCC) of a Primary Cell (PCell), a first Secondary Component Carrier (SCC) of a first Secondary Cell (SCell 1), and a second SCC of a Second Secondary Cell (SCell 2). With respect to each of the three CCs, the wireless communication device 212 is capable of measuring interference, namely, NR only ("pure NR") interference or mixed interference caused by NR traffic transmissions and LTE traffic transmissions. The wireless communication 212 may transmit Aperiodic Channel Status Information (A-CSI) reports for the measured interference to the base station 202 when the base station 202 triggers trigger states related to the measured interference.

The existing solutions for trigger state configuration and A-CSI report triggering for a DSS system with CA have a number of problems. A CSI report may include a combination of CSI Reference Symbol (CSI-RS) Resource Indicator (CRI), Rank Indicator (RI), Channel Quality Indicator (CQI), and Precoding Matrix Indicator (PMI). A common CSI report quantity used in NR is CRI-RI-CQI-PMI. If the CSI format is configured as wideband CQI and wideband PMI, then the CSI report includes two parts: CSI part 1 (CRI, RI, wideband CQI) and CSI part 2 (wideband PMI). If the CSI format is configured as subband CQI and subband PMI, then subband CQI and PMI are also included in the CSI report.

For the DSS system (e.g., Ericsson Spectrum Sharing (ESS) system), when four transmitters (4Tx) are used, the payload size for CSI part 1 is CRI (0)+RI (2)+CQI (4)=6 bits, and the payload size for CSI part 2 is PMI (2)=2 bits. If two reports are triggered at the same time, then the payload is increased. For CSI part 1, the payload size will be 12 bits plus 6 bits CRC. For CSI part 2, the payload size is 4 bits. Since A-CSI report is transmitted on a PUSCH, with the increased payload, it requires higher uplink channel quality to achieve good performance. If uplink channel quality is poor, triggering two CSI reports at the same time will lead to decoding failure in the uplink; thus the base station 202 couldn't get accurate CSI reports. Meanwhile, two CSI reports also increase the overhead on PUSCH.

Normally, an A-CSI report is triggered by a base station 202 if two conditions are fulfilled: the time since the last request exceeds a threshold and there is a buffer in downlink channels. If the base station 202 cannot trigger two reports at the same time, which means the base station 202 will only trigger one of them at one time, then the triggering frequency for each A-CSI report is extended unless the base station 202 increases the triggering frequency for each A-CSI report which consumes more Physical Downlink Control Channel (PDCCH) resources. The base station 202 cannot get frequent updates of CSI if the same triggering frequency is applied.

Furthermore, if the base station 202 wants to trigger one of the A-CSI reports at one time, the base station 202 needs to configure one trigger state corresponding to a single A-CSI report in a Radio Resource Control (RRC) message. As shown above, in Table 1, three possible trigger states (trigger state 0, trigger state 1, trigger state 2) need to be configured. However, the wireless communication device 212 has a limited number of trigger states that it can support, e.g., seven trigger states. Thus, the base station 202, especially in the DSS system with CA, may configure a limited number of different trigger states, which is lower than or equal to the maximum number of trigger states supported by the wireless communication device 212. For example, 3GPP Technical Specification (TS) 38.331 V16.4.1 release 16, clause 6.3.3 states that UE capacity information elements (IEs) include "maxNumberAperiodicCSI-triggeringState-PerCC ENUMERATED {n3, n7, n15, n31, n63, n128}," which indicates a maximum number of the A-CSI trigger states, per each CC, supported by the UE. For example, for 3CC CA, the radio access node normally needs to configure seven trigger states: {PCell, SCell1, SCell2, PCell+SCell1, PCell+SCell2, SCell1+SCell2, PCell+SCell1+SCell2}, where PCell is a primary cell, SCell1 is a first secondary cell, and Scell2 is a second secondary cell.

For each CC in a non-DSS system, there is only one trigger state per CC. However, in the DSS system, in order to receive two CSI reports, either (1) each trigger state includes two CSI reports at the same time, or (2) each CC is configured with three trigger states. In the former (1) case, a CSI report in case of poor channel quality cannot be guaranteed. The latter (2) case requires 7×3=21 trigger states in total, which are beyond the UE's support capability.

Systems and methods are disclosed herein that provide solutions to the aforementioned and/or other problems. Methods and systems of the present disclosure have the following advantages: 1) supporting CA among NR DSS cells when multiple Channel State information Interference Measurement (CSI-IM) resources are configured for each NR DSS cell, 2) improved NR downlink throughput for CA among NR DSS cells, 3) reducing the impact on the increased PUSCH payload when two CSI-IM resources are used for the DSS system, 4) reducing the impact on PDCCH capacity when two CSI-IM resources are used for the DSS system.

Figure 2:
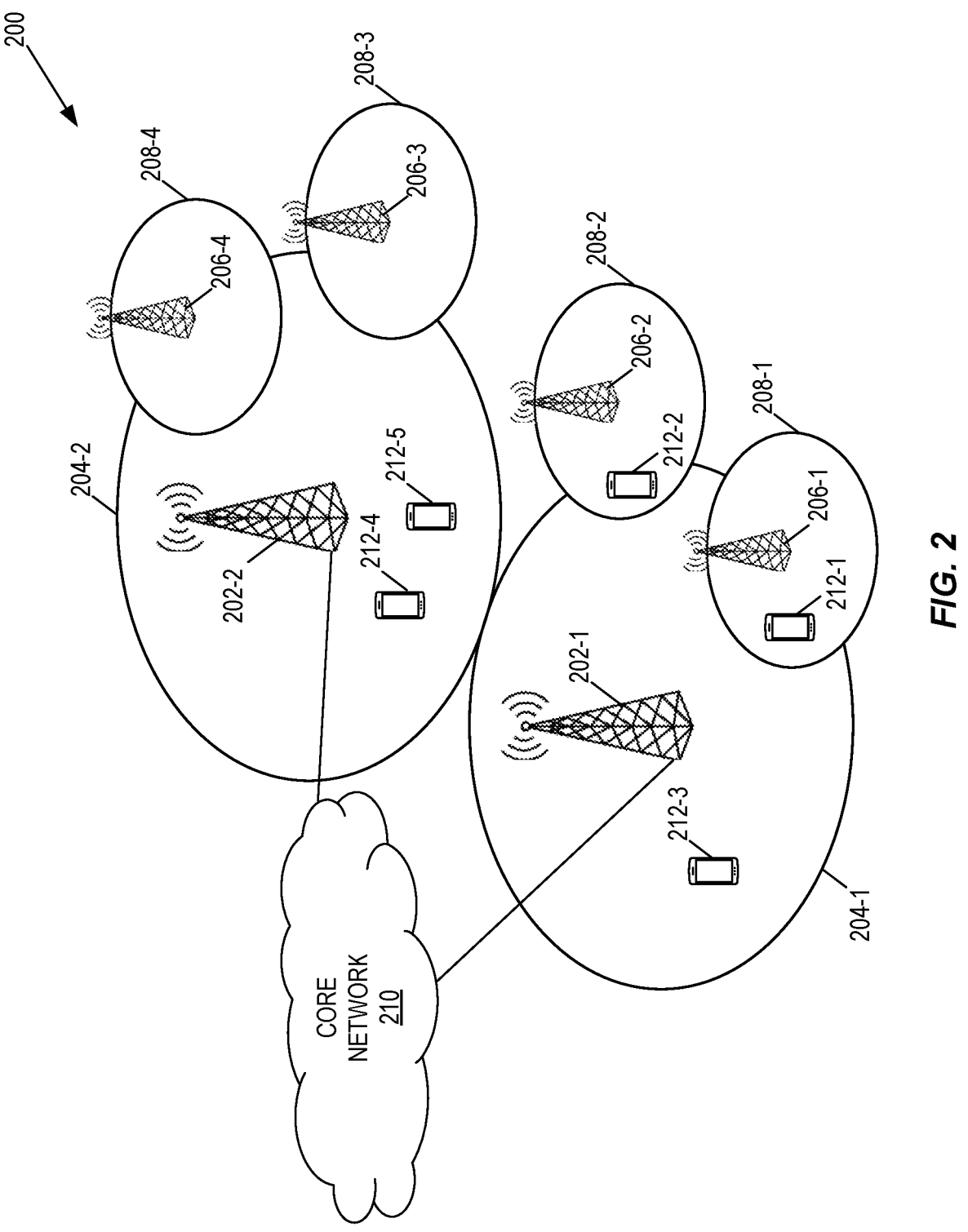
FIG. 2 illustrates one example of Dynamic Spectrum Sharing (DSS) system according to some embodiments of the present disclosure.

FIG. 2 illustrates one example of a cellular communications system 200 in which embodiments of the present disclosure may be implemented. In the embodiments described herein, the cellular communication system 200 is a DSS system (i.e., a cellular communication system 200 that enables DSS between two (or more) Radio Access Technologies (RATs) such as, in the examples described herein, LTE and NR). The cellular communications system 200 includes base stations 202-1 and 202-2 controlling corresponding (macro) cells 204-1 and 204-2. The base stations 202-1 and 202-2 are generally referred to herein collectively as base stations 202 and individually as the base station or the radio access node. Likewise, the (macro) cells 204-1 and 204-2 are generally referred to herein collectively as (macro) cells 204 and individually as (macro) cell 204. Importantly, the base stations 202 implement DSS in which the frequency spectrum is dynamically shared between NR traffic transmissions and LTE traffic transmissions.

The cellular communications system 200 may also include a number of low power nodes 206-1 through 206-4 controlling corresponding small cells 208-1 through 208-4. The low power nodes 206-1 through 206-4 can be small base stations (such as pico or femto base stations) or RRHs, or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208.

The cellular communications system 200 also includes a core network 210, which in the 5GS is referred to as the 5GC. The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as a wireless communication device 212. In the following description, the wireless communication devices 212 are oftentimes UEs, but the present disclosure is not limited thereto.

Trigger States Switch

Figure 3A:
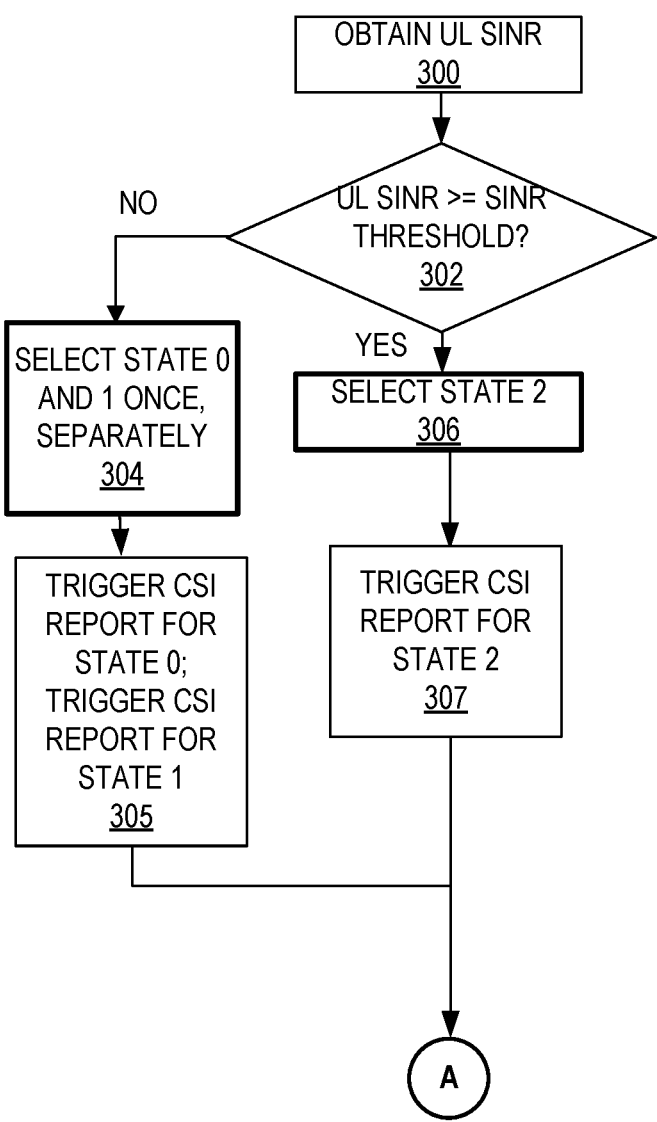
FIG. 3A illustrates one example of an initial triggering procedure in a trigger state switch according to some embodiments of the present disclosure.
Figure 3B:
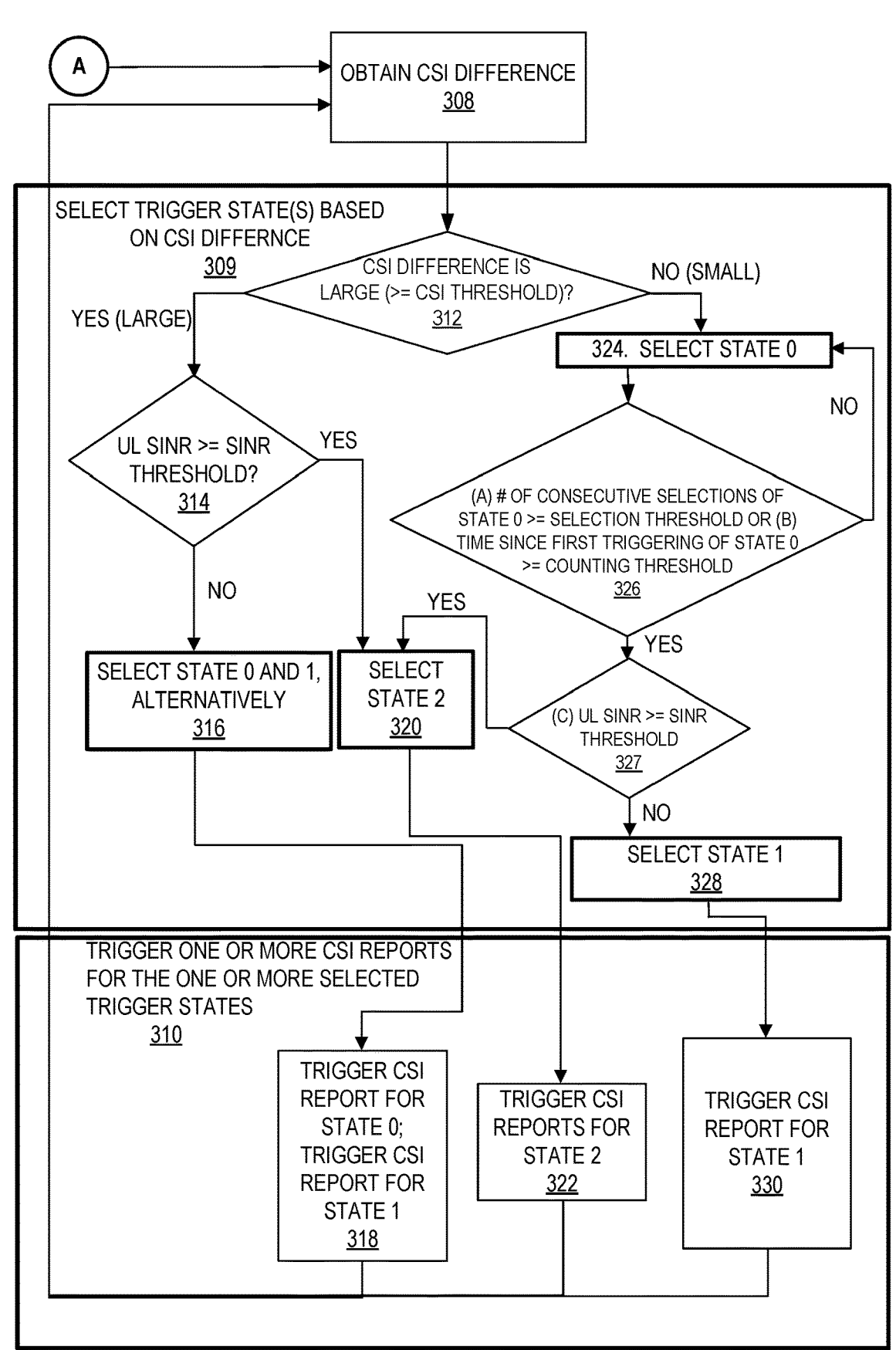
FIG. 3B illustrates one example of selecting and triggering procedures in the trigger state switch according to some embodiments of the present disclosure.

FIG. 3A and FIG. 3B illustrate one example procedure performed by a radio access node (e.g., a base station 202 or a network node that performs at least some of the functionality of a base station 202, e.g., a gNB-DU in a split RAN architecture) in a DSS system for switching among different trigger states. Based on CSI-IM configurations in Multimedia Broadcast Multicast Service Single Frequency Network (MBSFN) subframes and non-MBSFN subframes, a majority of subframes may experience both NR and LTE inter-cell interference, while a minority of subframes may experience pure NR interference. If there are both NR and LTE traffic transmissions in neighboring cells, the interference levels on those subframes are similar. Nevertheless, if there is only LTE traffic in neighboring cells, or NR penetration is quite low, the interference levels for those subframes are different. Therefore, if there is little difference in the interference levels, a single CSI report may be triggered to reduce the CSI payload to be transmitted in the uplink. If there is a large difference in the interference levels, both of the CSI reports (one for pure NR, another for NR+LTE) may need to be triggered, either alternatively or at the same time. The two CSI reports may provide proper channel status information for each subframe depending on uplink channel quality. The CSI difference on the interference levels may be reflected by a CSI difference for those subframes and then introduced as one of the A-CSI triggering conditions.

The CSI difference between two categorized subframes (MBSFN subframes and non-MBSFN subframes) is considered as "large" if the difference between filtered CQI for those two categorized subframes is larger than a threshold, or filtered RI is different. In contrast, the CSI difference between the two categorized subframes is considered as "small" if the difference between filtered CQI for those two categorized subframes is smaller than a threshold and filtered RI is the same. Filtered CQI (filtCQI) for the n-th subframe and filtered RI (filtRI) for the n-th subframe can be calculated as follows:

Filtered CQI (filtCQI):

$$filtCQI(n) = \text{alpha} * CQI + (1 - \text{alpha}) * filtCQI(n-1),$$

or the reported CQI is mapped to a Signal-to-Interference-plus-Noise-Ratio (SINR) value and the SINR is filtered as filtSINR(n)=alpha*SINR(CQI)+(1−alpha)*filtSINR(n−1)

Filtered RI (filtRI):

$$filtRI(n) = \text{alpha} * RI + (1 - \text{alpha}) * filtRI(n-1).$$

Alpha is a forgetting factor and could be configured to different values in network side.

More specifically, as illustrated in FIG. 3A, an initial triggering procedure is performed to obtain an initial CSI difference between the two categories of subframes (i.e., MBSFN subframes which include pure NR interference and non-MBSFN subframes which include mixed NR and LTE interference). For this initial triggering procedure, in one embodiment, the radio access node for the DSS system obtains an uplink SINR for a particular wireless communication device 212 (step 300) and determines whether the uplink SINR is equal to or greater than a predefined or preconfigured SINR threshold (step 302). If the uplink SINR is not equal to or greater than the SINR threshold (step 302, NO), the radio access node separately selects trigger states 0 and 1 and separately signals the selected trigger states to the wireless communication device 212 to thereby trigger separate CSI reports for the mixed interference and pure NR interference scenarios (steps 304 and 305). In other words, the radio access node selects trigger state 0 and signals trigger state 0 to the wireless communication device 212 to trigger a CSI report for the mixed interference scenario and separately selects trigger state 1 and signals trigger state 1 to the wireless communication device 212 to trigger a separate SCI report for the pure NR interference scenario. If the uplink SINR is equal to or greater than the SINR threshold (step 302, YES), the radio access node selects trigger state 2 for triggering both the first CSI report for the mixed interference scenario and the second CSI report for the non-mixed interference scenario (step 306) and triggers CSI reports for both the mixed interference and pure NR inter-ference scenarios by signaling trigger state 2 to the wireless communication device (step 307).

FIG. 3B illustrates the remaining steps of the trigger state switch performed after the initial triggering procedure of FIG. 3A. In one embodiment, the radio access node for the DSS system obtains a CSI difference, which is a difference between a first CSI measurement for subframes experienc-ing the mixed interference (e.g., interference caused by 4G LTE and 5G NR) and a second CSI measurement for subframes experiencing the non-mixed interference (e.g., interference caused by 5G NR only) in the DSS system (step 308). Based on the CSI difference, the radio access node selects one or more trigger states (step 309) and triggers one or more CSI reports for the one or more selected trigger states (step 310).

Specifically, when the CSI difference is large (i.e., when the CSI difference is equal to or larger than a predefined or preconfigured CSI difference threshold) (step 312, YES), the radio access node determines whether the uplink SINR is greater than or equal to the SINR threshold (step 314). If not (step 314, NO), the radio access node selects (step 316) and, alternatively and separately, signals the selected trigger states to the wireless communication device 212 to sepa-rately trigger a CSI report for the mixed interference sce-nario and a CSI report for pure NR interference scenario (step 318). Otherwise, if the uplink SNR is greater than or equal to the SINR threshold (step 314, YES), the radio access node selects (step 320) and signals trigger state 2 to the wireless communication device 212 to thereby trigger both the CSI report for the mixed interference scenario and the CSI report for the pure NR interference scenario at the same time (step 322).

Note that, in one embodiment, counting of triggering is reset when the uplink SINR is greater than the SINR threshold. Also note that, when the CSI reports (CSI report 0 and CSI report 1) for trigger state 0 and trigger state 1 are triggered via steps 316 and 318, in one embodiment, the ratio of the number of subframes with mixed interference and the number of subframes with pure NR interference could be considered to determine the triggering frequency for CSI report 0 and CSI report 1.

Returning to step 312, when the CSI difference is small (i.e., when the CSI difference is not equal to or larger than the CSI difference threshold), the radio access node selects trigger state 0 (step 324) and determines whether either (a) the number of consecutive selections of the trigger state 0 is equal to or greater than a selection threshold or (b) time since a first triggering of the trigger state 0 is equal to or greater than a counting threshold (step 326). If either (a) or (b) condition is met and if the uplink SINR is not equal to or greater than the SINR threshold (step 327, NO), the radio access node selects trigger state 1 (step 328) and signals trigger state 1 to the wireless communication device 212 to thereby trigger a CSI report for the pure NR interference scenario (step 330). Also, if either (a) or (b) condition is met and if the uplink SINR is equal to or greater than the SINR threshold (step 327, YES), the radio access node selects trigger state 2 (step 320) and signals trigger state 2 to the wireless communication device 212 to thereby trigger CSI reports (step 322). Also, if the number of consecutive selections of the trigger state 0 is not equal to or greater than a selection threshold (not (a)) and time since a first triggering of the trigger state 0 is equal to or greater than a counting threshold (not (b)) (step 326, NO), then the radio access node selects trigger state 0 (step 324).

Trigger States Selection, Configuration, and Triggering CSI Reports for the DSS system with CA In the trigger states switch disclosed above and illustrated in FIG. 3A and FIG. 3B, three trigger states (trigger state 0, trigger state 1, and trigger state 2) are configured for a cell of the DSS system. If CA is enabled in the cell of the DSS system, more trigger states need to be configured based on the number of CCs configured for CA. Since there is a limitation on the supported number of trigger states that can be configured at the wireless communication device 212, it is preferred to determine which trigger states are configured to achieve better performance.

FIG. 4 illustrates one example of a method performed by a radio access node for selecting, configuring, and triggering trigger states according to some embodiments of the present disclosure. The radio access node may be the base station 202 or a network node that implements at least part of the functionality of the base station 202 (e.g., a gNB-DU). The radio access node selects a set of trigger states for a wireless communication device 212 from a set of candidate trigger states (step 400). The selected set of trigger states comprises a number of trigger states that is less than or equal to a maximum number of trigger states supported by the wireless communication device 212. For each component carrier combination comprising one or more component carriers configured for the wireless communication device, the set of candidate trigger states comprises:

trigger state 0 for triggering a CSI report for a mixed interference scenario (e.g., interference caused by 4G LTE and 5G NR) for the DSS system for each com-ponent carrier in the component carrier combination, trigger state 1 for triggering a second CSI report for a non-mixed interference scenario (e.g., interference caused by 5G NR only) for the DSS system for each component carrier in the component carrier combina-tion, and trigger state 2 for triggering both the first CSI report for the mixed interference scenario for the dynamic spec-trum sharing system and the second CSI report for the non-mixed interference scenario for the DSS system for each component carrier in the component carrier com-bination.

As an example, if there are three component carriers consisting of a CC of a PCell (denoted as P), a CC of a first SCell (denoted as S1), and a CC of a second SCell (denoted as S2), then there are several CC combinations, namely: (1) P, (2), S1, (3) S2, (4) P+S1, (5) P+S2, (6) S1+S2, and (7) P+S1+S2. Then, in this example, the set of candidate trigger states consists of three trigger states (i.e., trigger states 0, 1, and 2) for each of the seven CC combinations, which gives a total of 21 candidate trigger states. Further assuming that, in this example, the wireless communication device 212 supports configuration of at most seven trigger states, then the radio access node selects up to seven trigger states from the set of 21 candidate trigger states to be configured for the wireless communication device 212. In one embodiment, the selected trigger states are a subset of the candidate trigger states that provide a desired level of performance (e.g., link adaptation performance based on received CSI reports).

The radio access node configures the selected set of trigger states to the wireless communication device 212 (step 402). Optionally, configuring the selected set of trigger states is done by sending a message (e.g., an RRC message) to the wireless communication device 212 (step 402-1).

The radio access node triggers one or more CSI reports for one of the configured trigger states, e.g., by signaling the one of the configured triggering states to the wireless communication device 212, e.g., via a DCI message (e.g., a DCI format 0 or uplink grant) (step 404). Optionally, the one of the configured trigger states to be triggered is selected based on a first set of parameters and/or a second set of parameters (step 404-1). Examples of the first set of parameters are activation status of secondary cells, uplink channel quality, or the CSI difference for categorized subframes (e.g., MBSFN subframes and non-MBSFN subframes). Examples of the second set of parameters are a CSI period, CSI categories, a cell type, and any combination of these parameters with any parameter in the first set. Optionally, triggering the one or more CSI reports is done by sending a message (e.g., a DCI message, e.g., a DCI format 0 or uplink grant, carried on a PDCCH) to the wireless communication device 212 (step 404-2).

As illustrated in FIG. 5, in one example, if the DSS system has three CCs and the wireless communication device 212 only supports up to seven trigger states, there are seven CC combinations, namely, (1) P, (2), S1, (3) S2, (4) P+S1, (5) P+S2, (6) S1+S2, and (7) P+S1+S2. In this example, there are three candidate trigger states for each CC combination, which are denoted herein as $TS_{A\_0}$, $TS_{A\_1}$, and $TS_{A\_2}$, where "A" denotes the CC combination (i.e., P, S1, S2, P+S1, etc.). $TS_{A\_0}$ is the candidate trigger state that triggers a CSI report for each CC in the CC combination for the mixed interference scenario, $TS_{A\_1}$ is the candidate trigger state that triggers a CSI report for each CC in the CC combination for the pure NR interference scenario, and $TS_{A\_2}$ is the candidate trigger state that triggers both the CSI report for the mixed interference scenario and the CSI report for the pure NR interference scenario for each CC in the CC combination. Because it is assumed that the wireless communication device 212 can support up to seven trigger states, the radio access node may configure up to seven of the candidate trigger states. The subset of the set of candidate trigger states that is configured to the wireless communication device 212 is referred to herein as a "configured set of trigger states", which is denoted as $\{TS_P, TS_{s1}, TS_{s2}, \ldots, TS_{p+s1+s2}\}$ where $TS_A$ is one of the three candidate trigger states $\{TS_{A\_0}, TS_{A\_1}, TS_{A\_2}\}$ that is selected for CC combination "A" and configured to the wireless communication device 212. Throughout the present disclosure, TS means a trigger state to be triggered for a CSI report; $TS_{A\_B}$ indicates a trigger state for a case of "A" CC combination and "B" interference scenario (0 for the mixed interference, 1 for the pure NR interference, and 2 for both of the mixed interference and the pure NR interference.)

As illustrated in FIG. 5, each CC combination has three trigger states corresponding to the CSI measurements of (1) the mixed interference, (2) the pure NR interference, and (3) both of the mixed interference and the pure NR interference. That is, the "candidate set of trigger states" includes 21 (7×3) trigger states: $TS_{P\_0}$, $TS_{P\_1}$, $TS_{P\_2}$, $TS_{s1\_0}$ . . . , $TS_{p+s1+s2\_2}$.

Figure 6:
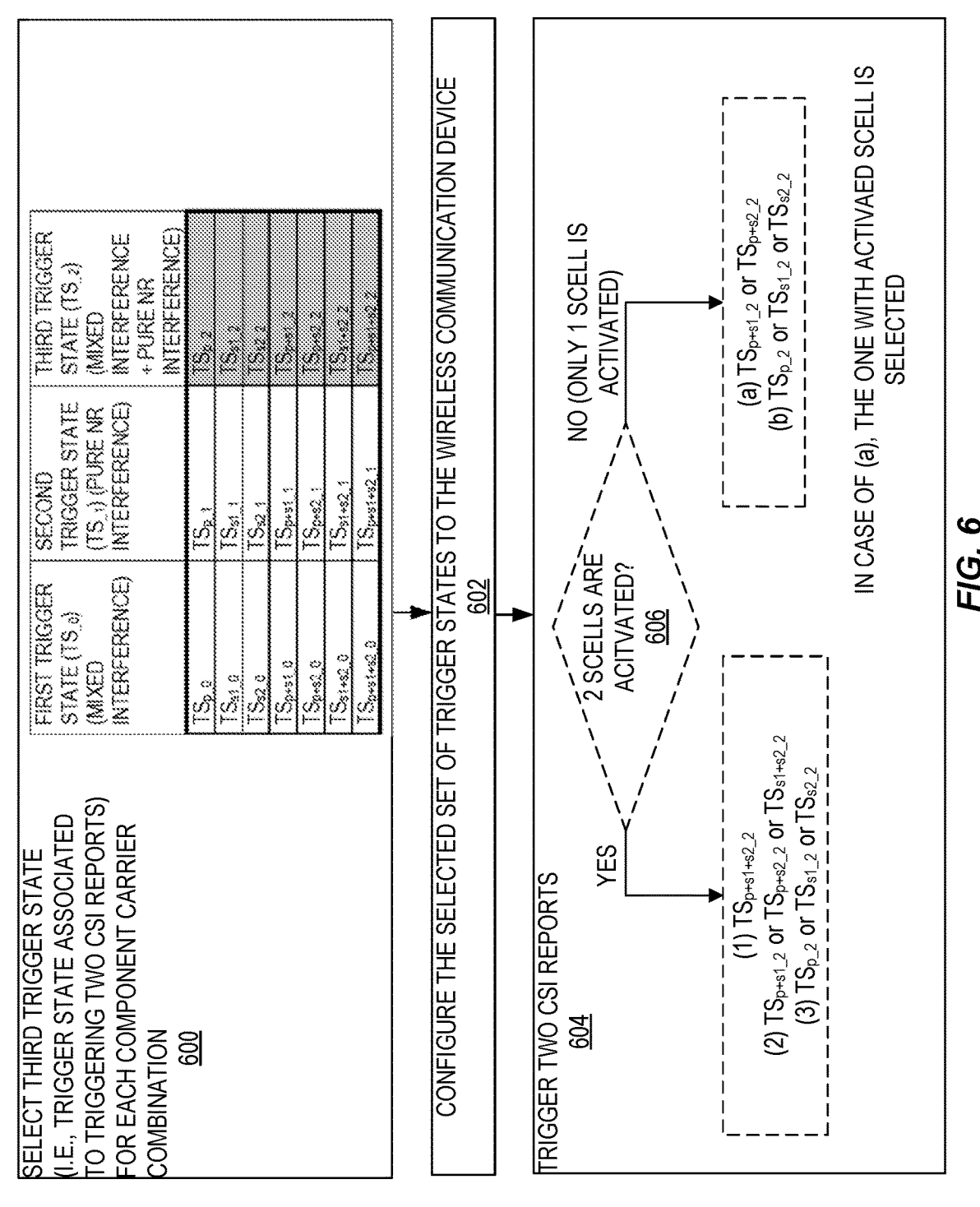
FIG. 6 illustrates one example of Option 1 according to some embodiments of the present disclosure.
Figure 7:
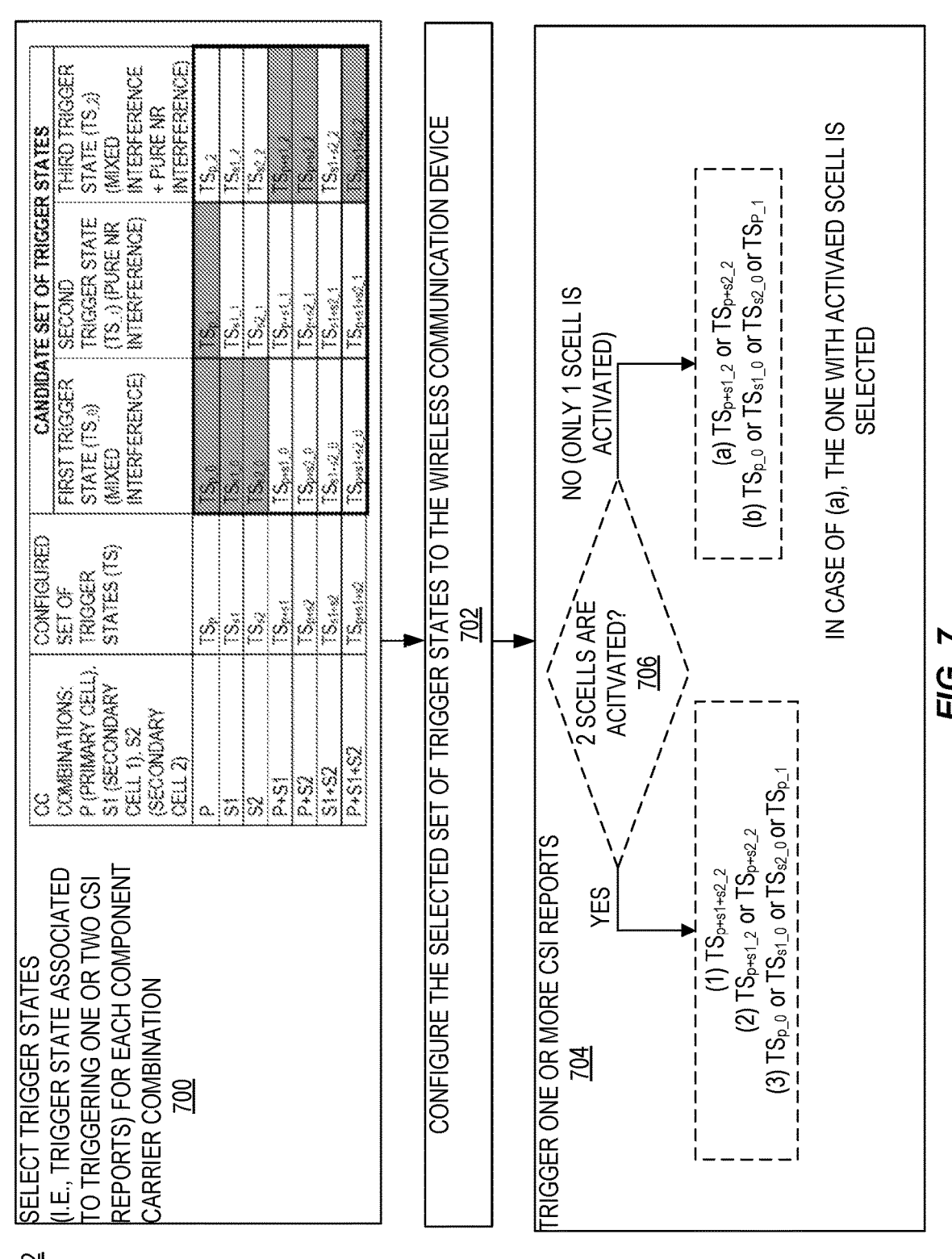
FIG. 7 illustrates one example of Option 2 according to some embodiments of the present disclosure.

In the example of the DSS system having the seven CC combinations and 21 candidates set of trigger states, there are various options for implementing the method disclosed above. FIG. 6, FIG. 7, and FIG. 8 respectively illustrate Option 1, Option 2, and Option 3, each of which incorporates some embodiments of the present disclosure.

Option 1 illustrated in FIG. 6 is directed to an embodiment in which candidate $TS_{A\_2}$ (i.e., the candidate trigger state for trigging both a CSI report for the mixed interference scenario and a CSI report for the pure NR interference scenario) is selected by the radio access node for all of the CC combinations trigger state 2 (step 600). Thus, the configured set of trigger states in this embodiment for the example above in which there are 3 CCs is $TS_{P\_2}$, $TS_{s1\_2}$, $TS_{s2\_2}$, . . . , $TS_{p+s1+s2\_2}$. In one embodiment, for each CC, the wireless communication device 212 is configured with two RRC IEs, CSI-AssociatedReportConfigInfo #0 and CSI-AssociatedReportConfigInfo #1, which may configure the wireless communication device 212 to report the two CSI measurements at the same time. The radio access node may configure the selected set of trigger states ($TS_{P\_2}$, $TS_{s1\_2}$, $TS_{s2\_2}$, . . . , $TS_{p+s1+s2\_2}$) to the wireless communication device 212 (step 602). Then, the radio access node may trigger two CSI reports for each CC in a particular CC combination by signaling the respective one of the configured trigger states to the wireless communication device 212, e.g., via DCI, e.g., a DCI format 0 or uplink grant (step 604).

Steps 600 and 604 may include the following optional steps. First, if two secondary cells are activated, the radio access node may select the following trigger states for the CC combinations (step 606) and then trigger CSI reports for the selected trigger states:

$$TS_{p+s1+s2\_2}(P + S1 + S2), \tag{1}$$

$$TS_{p+s1\_2}(P + S1) \text{ or } TS_{p+s2\_2}(P + S2) \text{ or } TS_{s1+s2\_2}(S1 + S2), \tag{2}$$

$$TS_{p\_2}(P) \text{ or } TS_{s1\_2}(S1) \text{ or } TS_{s2\_2}(S2). \tag{3}$$

Two CSI reports for the selected trigger states are triggered (step 608).

Second, if only one secondary cell is activated, the following trigger states for the CC combinations may be selected (step 610) and then relevant CSI reports are triggered:

$$TS_{p+s1\_2}(P + S1) \text{ or } TS_{p+s2\_2}(P + S2), \text{ and} \tag{a}$$

$$TS_{p\_2}(P) \text{ or } TS_{s1\_2}(S1) \text{ or } TS_{s2\_2}(S2). \tag{b}$$

The trigger state having the activated secondary cell is selected.

In one embodiment, the process of FIG. 6 is modified such that CSI reports for a smaller number of CCs will be triggered if the uplink channel quality is poor. For example, even if there are 3 CCs in total, the radio access node selects a trigger state to be signaled to the wireless communication device 212 considering only the configured trigger states for the 2CC combinations or only the configured trigger states for the 1CC combinations in order to reduce the total number of CSI reports triggered at the same time. For the alternative with only 1CC, in one embodiment, two CSI reports are triggered for different subframes. In this way, the radio access node may make sure to get two CSI reports. However, in the poor uplink channel condition, the decoding of a CSI report may fail. This option can be applied to a cell with a relatively small cell range in which the uplink coverage is not an issue. For a cell that may be limited in uplink coverage, another option (e.g., Option 2) may be used.

FIG. 7 illustrates the operation of the radio access node in accordance with Option 2 of the present disclosure. In Option 2, some trigger states associated with only one CSI report are configured to the wireless communication device 212, which may be advantageous when the uplink quality is poor. For example, if there are 3 CCs and two CSI reports per CC, six (3×2) trigger states are needed to cover all possibilities when only one CSI report is triggered at a time. If the wireless communication device 212 supports configuration of up to 7 trigger states, it is not desirable to configure 6 trigger states associated with only 1 CSI report. With such a configuration, sometimes, one CSI report for some CC may be requested even if the uplink is good enough to support multiple CSI reports. The configuration requires more PDCCH resources and likely more PUSCH resources as the triggering frequency needs to be increased in order to get multiple CSI reports. Thus, it may be preferred to balance the single CSI report and the multiple CSI reports. One example of such balance is shown below.

As illustrated in FIG. 7, in Option 2, the radio access node selects a set of trigger states to be configured to the wireless communication device 212 from the set of candidate set of trigger states (step 700). In this particular example, the set of configured trigger states is: $TS_{p\_0}$, $TS_{p\_1}$, $TS_{s1\_0}$, $TS_{s2\_0}$, $TS_{p+s1\_2}$, $TS_{p+s1\_2}$, and $TS_{p+s1+s2\_2}$. Thus, in this example, four of the seven configured trigger states will trigger a single CSI report for each CC in the respective CC combination. The radio access node configures the wireless communication device 212 with the selected set of trigger states, e.g., via an RRC message(s) (step 702). The radio access node triggers one or more CSI reports by signaling one of the configured trigger states to the wireless communication device 212 (step 704). If the uplink channel condition is poor, a single CSI report for some of the trigger states ($TS_{p\_0}$, $TS_{p\_1}$, $TS_{s1\_0}$, $TS_{s2\_0}$) may be triggered by signaling those trigger states to the wireless communication device 212 in step 704.

Steps 700 and 704 may include the following optional steps. First, if two secondary cells are activated, the radio access node may select the following trigger states for the CC combinations (step 706), and then trigger CSI reports for the selected trigger states:

$$TS_{p+s1+s2\_2}(P + S1 + S2), \tag{1}$$

$$TS_{p+s1\_2}(P + S1), \text{ or } TS_{p+s2\_2}(P + S2), \tag{2}$$

$$TS_{p\_0}(P) \text{ or } TS_{s1\_0}(S1) \text{ or } TS_{s2\_0}(S2) \text{ or } TS_{p\_1}(P). \tag{3}$$

Second, if only one secondary cell is activated, the following trigger states for the CC combinations may be selected (step 706) and then relevant CSI reports are triggered:

$$TS_{p+s1\_2}(P + S1) \text{ or } TS_{p+s2\_2}(P + S2), \tag{a}$$

$$TS_{p\_0}(P) \text{ or } TS_{s1\_0}(S1) \text{ or } TS_{s2\_0}(S2) \text{ or } TS_{P\_1}(P). \tag{b}$$

In the case of (a), the trigger state having the activated secondary cell is selected, and relevant CSI reports are triggered.

Compared with Option 1, in Option 2, the radio access node may receive correct CSI reports during poor channel conditions, but the actual triggering frequency may be extended. Option 2 may be applied to a cell that channel condition is changing slowly so that the increased periodicity of CSI reporting will have less impact on the performance. One important aspect for Option 2 is to configure some trigger states associated with one CSI report. There are many possibilities. The seven trigger states described above are just one example.

FIG. 8 illustrates the operation of a radio node in accordance with Option 3. In Option 3, if different reporting periods are preferred for the two CSI reports corresponding to two sets of subframes (subframes with both NR and LTE interference and subframes with pure NR interference), then a trigger state may include only a single CSI report for all CCs involved. Two CSI reports are triggered separately based on the preferred periodicity. That is, one set of CSI reports with a first periodicity is triggered, and another set of CSI reports with a second periodicity is separately triggered. More specifically, as illustrated in FIG. 8, the radio access node selects either $TS_{A\_0}$ or $TS_{A\_1}$ for each CC combination (step 800). In other words, for each CC combination, the radio access node selects either of the two candidate trigger states associated to a single CSI report for that CC combination. In the illustrated example, the selected set of trigger states is: $TS_{p\_0}$, $TS_{s1\_0}$, $TS_{s2\_0}$, $TS_{p+s1\_0}$, $TS_{p+s1\_1}$, $TS_{p+s2\_0}$, and $TS_{p+s2\_1}$. The radio access node configures the wireless communication device 212 with the selected set of trigger states (step 802). The radio access node then triggers one set of CSI reports with a first periodicity (e.g., triggers CSI reports associated to $TS_{p\_0}$, $TS_{s1\_0}$, $TS_{s2\_0}$, $TS_{p+s1\_0}$, $TS_{p+s2\_0}$ with a first periodicity) and triggers another set of CSI reports with a second periodicity (e.g., triggers CSI reports associated to $TS_{p+s1\_1}$ and $TS_{p+s2\_1}$ with a second periodicity) (step 804). Preferably, the second periodicity is different than (e.g., less than) the first periodicity.

Furthermore, if the primary cell has a larger coverage than the secondary cells and the uplink of the primary cell is poor, the downlink for both of the secondary cells is already too bad to be used. In this case, the single CSI reports for the trigger states in the secondary cells are not needed. Step 800 of FIG. 8 illustrates one example of the selected set of trigger states for this case, which excludes the single CSI reports for the trigger states in secondary cells ($TS_{s1\_0}$, $TS_{s2\_0}$): $TS_{p\_0}$, $TS_{p+s1\_0}$, $TS_{p+s1\_1}$, $TS_{p+s2\_0}$, $TS_{p+s2\_1}$, $TS_{p+s1+s2\_0}$, and $TS_{p+s1+s2\_1}$.

In much of the description above, the wireless communication device 212 is assumed to support the configuration of up to 7 trigger states. However, the present disclosure is not limited thereto. In this regard, FIG. 9 illustrates one example of the selected trigger states that are configured to the wireless communication device 212 for an embodiment in which the wireless communication device 212 supports the configuration of 15 or more trigger states. As illustrated in FIG. 9, in this example, the following 15 trigger states may be included in the selected set of trigger states that are configured to the wireless communication device 212:

$TS_{p\_2}$, $TS_{s1\_2}$, $TS_{s2\_2}$, $TS_{p+s1\_2}$, $TS_{p+s2\_2}$, $TS_{s1+s2\_2}$, and $TS_{p+s1+s2\_2}$ (trigger state 2)

$TS_{p\_0}$, $TS_{s1\_0}$, $TS_{s2\_0}$, and $TS_{p+s1+s2\_0}$ (trigger state 0)

$TS_{p\_1}$, $TS_{s1\_1}$, $TS_{s2\_1}$, and $TS_{p+s1+s2\_1}$ (trigger state 1)

If two secondary cells are activated, the following trigger states may be selected for triggering of the associated CSI report(s):

(a) $TS_{p+s1+s2\_2}$ (P+S1+S2), (b) $TS_{p+1+s2\_0}$ or $TS_{p+s1+s2\_1}$ (P+S1+S2), (c) $TS_{p+s1\_2}$ (P+S1) or $TS_{p+s2\_2}$ (P+S2) or $TS_{s1+s2\_2}$ (S1+S2), (d) $TS_{p\_2}$ (P) or $TS_{s1\_2}$ (S1) or $TS_{s2\_2}$ (S2), (e) $TS_{p\_0}$ (P) or $TS_{s1\_0}$ (S1) or $TS_{s2\_0}$ (S2) or $TS_{p\_1}$ (P) or $TS_{s1\_1}$ (S1) or $TS_{s2\_1}$ (S2).

If only one secondary cell is activated, the following trigger states may be selected for triggering of the associated CSI report(s):

(1) $TS_{p+s1\_2}$ (P+S1) or $TS_{p+s2\_2}$ (P+S2), (2) $TS_{p\_2}$ (P) or $TS_{s1\_2}$ (S1) or $TS_{s2\_2}$ (S2), (3) $TS_{p\_0}$ (P) or $TS_{s1\_0}$ (S1) or $TS_{s2\_0}$ (S2) or $TS_{p\_1}$ (P) or $TS_{s1\_1}$ (S1) or $TS_{s2\_1}$ (S2).

In the case of (1), the trigger state having the activated secondary cell is selected.

As illustrated in FIG. 9, when different reporting periods are preferred, the following 14 trigger states may be selected for configuration to the wireless communication device 212:

$TS_{p\_0}$, $TS_{s1\_0}$, $TS_{s2\_0}$, $TS_{p+s1\_0}$, $TS_{p+s2\_0}$, $TS_{s1+s2\_0}$, and $TS_{p+s1+s2\_0}$ (trigger state 0)

$TS_{p\_1}$, $TS_{s1\_1}$, $TS_{s2\_1}$, $TS_{p+s1\_1}$, $TS_{p+s2\_1}$, $TS_{s1+s2\_1}$, and $TS_{p+s1+s2\_1}$ (trigger state 1)

Trigger State Selection among Configured States

It is stated earlier that one trigger state (trigger state 0, trigger state 1, or trigger state 2) is selected based on uplink quality and CSI difference. Given the uplink quality and CSI difference, there may be multiple configured trigger states that are associated with the same number of CSI reports. Thus, a method to select one of the configured trigger states to be signaled to the wireless communication device 212 to trigger the associated CSI report(s) may be used, e.g., in steps 404, 604, 704, or 804. This selection may be based on certain criteria. For example, the following factors may be considered for this selection:

CSI report age: this factor indicates a time interval since the last CSI report for the one of the configured trigger states is received by the radio access node, CSI period: for A-CSI reporting, this factor is the minimal time interval between the two A-CSI reports, CSI category: this factor indicates CSI report for different categorized subframes. As described earlier, one CSI report is used for the subframes with mixed interference and the other CSI repot is used for the subframes with pure NR interference. If mixed interference is seen in more subframes, then CSI report for mixed interference is more important, and Cell type: this factor indicates whether the serving cell is the primary cell or the secondary cell.

For CA involving multiple cells, it may be better to use a single value matrix to select a trigger state. First, some weight factors are defined. $W_{cell}$ is a weight based on cell type. A primary cell (PCell) can have a weight. A secondary cell (SCell) may have a smaller weight than the weight of the PCell if the SCell software entity does not reside on the same hardware unit. $W_{csi}$ is a weight based on the CSI category. CSI used in more subframes may have a larger weight. A CSI age matrix ("A") may be defined as below.

$$A = \sum W_{cell} * W_{csi} * (CSI\ age)/(CSI\ period)$$

The sum is over all possible CSI reports for all activated CCs. It may be possible that the CSI category is already taken into account when CSI period is determined. In that case, $W_{csi}$ is not needed in the CSI age matrix. With the CSI age matrix, the CSI candidate with the largest CSI age matrix is selected among all candidates with the same number of CSI reports.

For example, if 2 CC CA is configured and the wireless communication device 212 is capable of supporting up to seven trigger states, the following seven trigger states may be selected and configured:

$TS_{p\_2}$ (PCell) or $TS_{s\_2}$ (SCell) or $TS_{p+s\_2}$ (PCell+SCell): trigger state 2 for two CSI reports $TS_{p\_0}$ (PCell) or $TS_{s\_0}$ (SCell): trigger state 0 for one CSI report $TS_{p\_1}$ (PCell) or $TS_{s\_1}$ (SCell): trigger state 1 for one CSI report That is, there are four trigger states that are associated with a single CSI report: $TS_{p\_0}$ (PCell for CSI report 0), $TS_{s\_0}$ (SCell for CSI report 0), $TS_{p\_1}$ (PCell for CSI report 1), and $TS_{s\_1}$ (SCell for CSI report 1). Assuming that for both PCell and SCell the report periods for CSI report 0 and 1 are 20 ms and 40 ms, respectively. Also, for both PCell and SCell, the age for CSI report 0 and 1 may be assumed as 25 ms and 45 ms, respectively. Then, the CSI age matrices for the 4 trigger states calculated as below:

$W_{PCell}*(25/20)$ for $TS_{p\_0}$ (PCell for CSI report 0)

$W_{PCell}*(45/40)$ for $TS_{p\_1}$ (PCell for CSI report 1)

$W_{PCell}*(25/20)$ for $TS_{s\_0}$ (SCell for CSI report 0)

$W_{PCell}*(45/40)$ for $TS_{s\_1}$ (SCell for CSI report 1)

The above CSI age matrices indicate that, for PCell, although the age for CSI report 1 is longer than that for CSI report 0, the age matrix for CSI report 1 is lower due to its longer period. This applies to SCell as well. Between PCell report 0 and SCell report 0, the age matrix is determined by the cell type weight factor given their period and age are the same.

Figure 10:
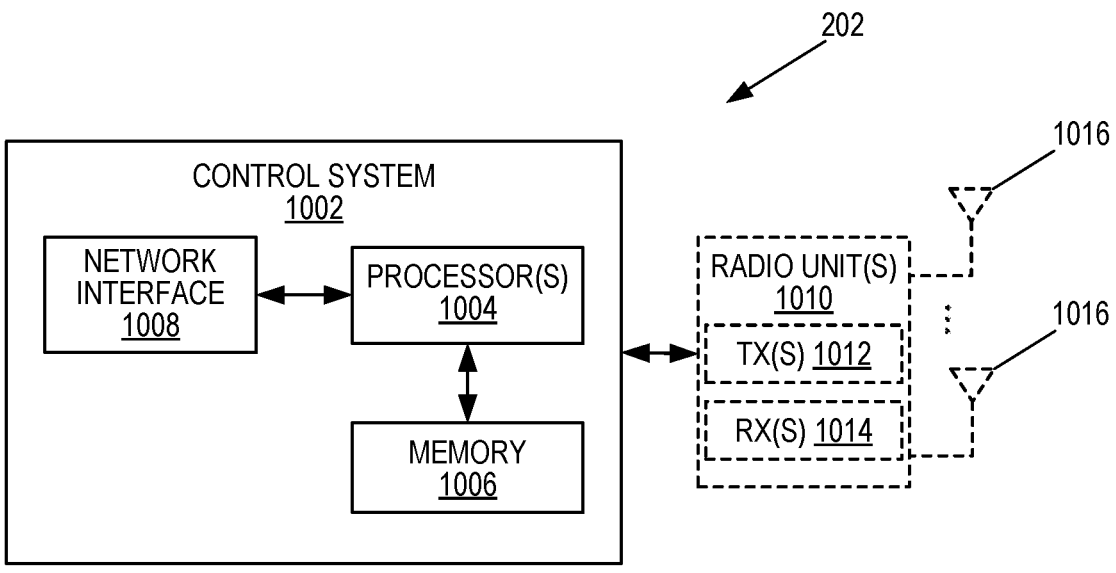
FIG. 10 is a schematic block diagram of a radio access node according to some embodiments of the present disclosure.

FIG. 10 is a schematic block diagram of a radio access node 1000 according to some embodiments of the present disclosure. Optional features are represented by dashed boxes. The radio access node 1000 may be, for example, a base station 202 or a network node that implements all or part of the functionality of the base station 202 described herein. As illustrated, the radio access node 1000 includes a control system 1002 that includes one or more processors 1004 (e.g., Central Processing Units (CPUs), Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the radio access node 1000 may include one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of the radio access node 1000 as described herein, e.g., with respect to FIGS. 4 through 9. In some embodiments, the function(s) are implemented in software that is stored, e.g., in the memory 1006 and executed by the one or more processors 1004.

Figure 11:
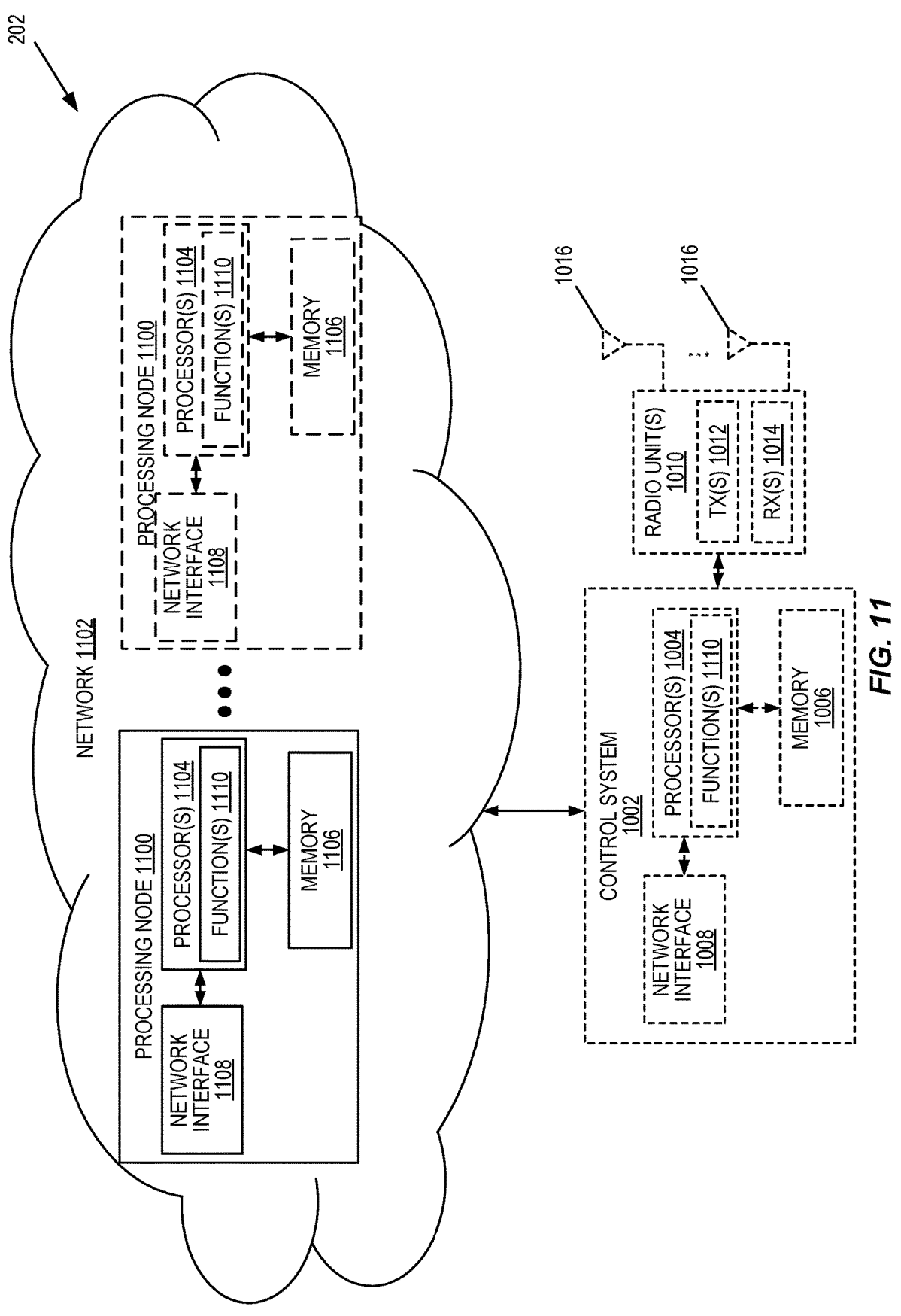
FIG. 11 is a schematic block diagram that illustrates a virtualized embodiment of the radio access node of FIG. 10 according to some embodiments of the present disclosure.

FIG. 11 is a schematic block diagram that illustrates a virtualized embodiment of the radio access node 1000 according to some embodiments of the present disclosure. Again, optional features are represented by dashed boxes. As used herein, a "virtualized" radio access node is an implementation of the radio access node 1000 in which at least a portion of the functionality of the radio access node 1000 is implemented as a virtual component(s) (e.g., via a virtual machine(s) executing on a physical processing node(s) in a network(s)). As illustrated, in this example, the radio access node 1000 may include the control system 1002 and/or the one or more radio units 1010, as described above. The control system 1002 may be connected to the radio unit(s) 1010 via, for example, an optical cable or the like. The radio access node 1000 includes one or more processing nodes 1100 coupled to or included as part of a network(s) 1102. If present, the control system 1002 or the radio unit(s) are connected to the processing node(s) 1100 via the network 1102. Each processing node 1100 includes one or more processors 1104 (e.g., CPUs, ASICS, FPGAS, and/or the like), memory 1106, and a network interface 1108.

In this example, functions 1110 of the radio access node 1000 described herein are implemented at the one or more processing nodes 1100 or distributed across the one or more processing nodes 1100 and the control system 1002 and/or the radio unit(s) 1010 in any desired manner. In some particular embodiments, some or all of the functions 1110 of the radio access node 1000 described herein are implemented as virtual components executed by one or more virtual machines implemented in a virtual environment(s) hosted by the processing node(s) 1100. As will be appreciated by one of ordinary skill in the art, additional signaling or communication between the processing node(s) 1100 and the control system 1002 is used in order to carry out at least some of the desired functions 1110. Notably, in some embodiments, the control system 1002 may not be included, in which case the radio unit(s) 1010 communicate directly with the processing node(s) 1100 via an appropriate network interface(s).

In some embodiments, a computer program including instructions which, when executed by at least one processor, causes the at least one processor to carry out the functionality of the radio access node 1000 or a node (e.g., a processing node 1100) implementing one or more of the functions 1110 of the radio access node 1000 in a virtual environment according to any of the embodiments described herein is provided. In some embodiments, a carrier comprising the aforementioned computer program product is provided. The carrier is one of an electronic signal, an optical signal, a radio signal, or a computer-readable storage medium (e.g., a non-transitory computer-readable medium such as memory).

Figure 12:
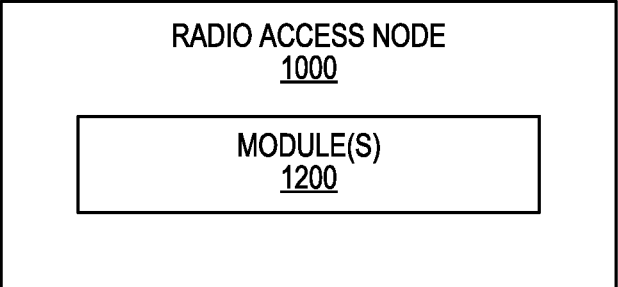
FIG. 12 is a schematic block diagram of the radio access node of FIG. 10 according to some other embodiments of the present disclosure.

FIG. 12 is a schematic block diagram of the radio access node 1000 according to some other embodiments of the present disclosure. The radio access node 1000 includes one or more modules 1200, each of which is implemented in software. The module(s) 1200 provide the functionality of the radio access node 1000 described herein. This discussion is equally applicable to the processing node 1100 of FIG. 11 where the modules 1200 may be implemented at one of the processing nodes 1100 or distributed across multiple processing nodes 1100 and/or distributed across the processing node(s) 1100 and the control system 1002.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
5GS Fifth Generation System
A-CSI Aperiodic Channel State Information
ASIC Application Specific Integrated Circuit
CA Carrier Aggregation
CC
CPU
Component Carrier
Central Processing Unit
CQI Channel Quality Indicator
CRI Channel State Information Reference Symbol (CSI-RS) Resource Indicator
CRS Cell-specific Reference Signal
CSI Channel State Information
CSI-IM Channel State Information Interference Measurement
CSI-RS Channel State Information Reference Signal
DCI Downlink Control Information
DSP Digital Signal Processor
DSS Dynamic Spectrum Sharing
eNB Enhanced or Evolved Node B
EPC Evolved Packet Core
EPS Evolved Packet System
ESS Ericsson Spectrum Sharing
E-UTRAN Evolved Universal Terrestrial RAN
FPGA Field Programmable Gate Arrays
gNB next Generation NodeB
IoT Internet of Things
LTE Long Term Evolution
MAC Medium Access Control
MBMS Multimedia Broadcast Multicast Services
MBSFN
Multimedia Broadcast Multicast Service Single Frequency Network
MS Milliseconds
MTC Machine Type Communication
NG-RAN Next Generation Radio Access Node
NR New Radio
PC Personal Computer
PCell Primary serving Cell
PDCCH Physical Downlink Control Channel
PDSCH Physical Downlink Shared Channel
PMI Precoding Matrix Indicator PRS Positioning Reference Signal
PUSCH Physical Uplink Shared Channel
RAM Random Access Memory
RAN Radio Access Network
RAT Radio Access Technology
RE Resource Element
RI Rank Indicator
ROM Read Only Memory
RRC Radio Resource Control
RRH Remote Radio Head
SCell
Secondary serving Cell
Signal-to-Interference-plus-Noise Ratio
SINR
TCI Transmission Configuration Indicator
TP Transmission Point
TRP Transmission/Reception Point
TRS Tracking Reference Signal
TS Technical Specification
UE User Equipment Those skilled in the art will recognize improvements and modifications to the embodiments of the present disclosure. All such improvements and modifications are considered within the scope of the concepts disclosed herein.

The invention claimed is:

1. A method performed by a radio access node for a Dynamic Spectrum Sharing (DSS) system, the method comprising:
  selecting a set of trigger states for a wireless communication device from a set of candidate trigger states:
    the selected set of trigger states comprising a number of trigger states that is less than or equal to a maximum number of trigger states supported by the wireless communication device; and
    the set of candidate trigger states comprising, for each component carrier combination comprising one or more component carriers configured for the wireless communication device:
      trigger state 0 for triggering a first Channel State Information (CSI) report for a mixed interference scenario for the DSS system for each component carrier in the component carrier combination, the mixed interference scenario being interference caused by New Radio (NR) traffic transmissions and Long Term Evolution (LTE) traffic transmissions;
      trigger state 1 for triggering a second CSI report for a non-mixed interference scenario for the DSS system for each component carrier in the component carrier combination, the non-mixed interference scenario being pure NR interference; and
      trigger state 2 for triggering both the first CSI report for the mixed interference scenario for the DSS system and the second CSI report for the non-mixed interference scenario for the DSS system for each component carrier in the component carrier combination;
  configuring the selected set of trigger states to the wireless communication device; and
  triggering one or more CSI reports for one of the configured trigger states.

2. The method of claim 1, wherein configuring the selected set of trigger states to the wireless communication device comprises sending a first message to the wireless communication device that configures the wireless communication device with the selected set of trigger states.

3. The method of claim 2, wherein the first message comprises a Radio Resource Control (RRC) message.

4. The method of claim 1, wherein triggering the one or more CSI reports for one of the configured trigger states comprises:
  selecting the one of the configured trigger states to be triggered; and
  sending a message, to the wireless communication device, that triggers the one or more CSI reports for the one of the configured trigger states.

5. The method of claim 4, wherein selecting the one of the configured trigger states to be triggered comprises selecting the one of the configured trigger states to be triggered based on a first set of parameters.

6. The method of claim 5, wherein the first set of parameters comprises: (a) an activation status of one or more secondary cells, (b) an uplink channel quality, (c) a difference between a first CSI measurement for subframes experiencing the mixed interference and a second CSI measurement for subframes experiencing the non-mixed interference in the DSS system, (d) a CSI report age representing a time interval since a last CSI report for the one of the configured trigger states is received, or (e) any combination of two or more of (a)-(d).

7. The method of claim 6, wherein selecting the one of the configured trigger states to be triggered further comprises selecting the one of the configured trigger states to be triggered based on a second set of parameters, the second set of parameters comprising (f) a CSI report period, (g) a CSI category, (h) a cell type, (i) any combination of two or more of (f)-(i), or (j) any combination of any of (f)-(i) with any of (a)-(d) in the first set.

8. The method of claim 1, wherein:
  the set of trigger states configured to the wireless communication device comprises, for each component carrier combination, the trigger state 2 for the component carrier combination.

9. The method of claim 1, wherein:
  the set of configured trigger states configured to the wireless communication device comprises:
    for at least one first component carrier combination, either the trigger state 0 or the trigger state 1 for the at least one first component carrier combination; and
    for at least one second component carrier combination, the trigger state 2 for the at least one second component carrier combination.

10. The method of claim 9, wherein:
  the at least one first component carrier combination comprises component carrier combinations having a single component carrier; and
  the at least one second component carrier combination comprises component carrier combinations having at least two component carriers.

11. The method of claim 1, wherein the set of trigger states configured to the wireless communication device comprises, for each component carrier combination, either the trigger state 0 or the trigger state 1 for the component carrier combination.

12. The method of claim 11, wherein a single CSI report is triggered at a first periodicity for at least one first component carrier combination for which the set of trigger states comprises the trigger state 0 and at a second periodicity for at least one second component carrier combination for which the set of configured trigger states comprises the trigger state 1.

13. The method of claim 1, wherein triggering the one or more CSI reports for the one of the configured trigger states comprises sending, to the wireless communication device, a second message that triggers the one or more CSI reports for the one of the configured trigger states.

14. The method of claim 13, wherein the second message comprises a Physical Downlink Control Channel (PDCCH) message.

15. A radio access node for a Dynamic Spectrum Sharing (DSS) system, comprising processing circuitry configured to cause the radio access node to:

select a set of trigger states for a wireless communication device from a set of candidate trigger states:

the selected set of trigger states consisting of a number of trigger states that is less than or equal to a maximum number of trigger states supported by the wireless communication device; and the set of candidate trigger states comprising, for each component carrier combination comprising one or more component carriers configured for the wireless communication device:

trigger state 0 for triggering a first Channel State Information, CSI, (CSI) report for a mixed interference scenario for the DSS system for each component carrier in the component carrier combination, the mixed interference scenario being interference caused by New Radio (NR) traffic transmissions and Long Term Evolution (LTE) traffic transmissions;

trigger state 1 for triggering a second CSI report for a non-mixed interference scenario for the DSS system for each component carrier in the component carrier combination, the non-mixed interference scenario being pure NR interference; and trigger state 2 for triggering both the first CSI report for the mixed interference scenario for the DSS system and the second CSI report for the non-mixed interference scenario for the DSS system for each component carrier in the component carrier combination;

configure the selected set of trigger states to the wireless communication device; and trigger one or more CSI reports for one of the configured trigger states.

* * * * *